(12) United States Patent
Weslake et al.

(10) Patent No.: US 8,063,784 B2
(45) Date of Patent: *Nov. 22, 2011

(54) VISUAL IDENTIFICATION TAG DEACTIVATION

(75) Inventors: Paul Weslake, Warwick, RI (US); James O'Hagan, McHenry, IL (US); Clive Hohberger, Highland Park, IL (US)

(73) Assignee: ZIH Corp., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/718,711

(22) Filed: Mar. 5, 2010

(65) Prior Publication Data
US 2010/0214115 A1 Aug. 26, 2010

Related U.S. Application Data

(63) Continuation of application No. 11/954,746, filed on Dec. 12, 2007, now Pat. No. 7,701,345, which is a continuation of application No. 11/190,646, filed on Jul. 27, 2005, now Pat. No. 7,327,261.

(51) Int. Cl.
*G08B 13/14* (2006.01)
(52) U.S. Cl. ............... 340/572.1; 340/572.4; 340/568.1
(58) Field of Classification Search .............. 340/572.1, 340/572.3, 572.4, 572.5, 568.1, 568.7, 10.1; 116/216, 217, 307; 385/380, 383, 385
See application file for complete search history.

(56) References Cited

U.S. PATENT DOCUMENTS

| | | | |
|---|---|---|---|
| 2,730,456 A | 1/1956 | Green et al. | |
| 2,730,457 A | 1/1956 | Green et al. | |
| 4,778,552 A | 10/1988 | Benge et al. | |
| 4,802,944 A | 2/1989 | Benge | |
| 4,846,922 A | 7/1989 | Benge et al. | |
| 4,876,555 A | 10/1989 | Jorgensen | |
| 4,910,499 A | 3/1990 | Benge et al. | |
| 4,954,814 A | 9/1990 | Benge | |
| 4,967,185 A | 10/1990 | Montean | |
| 4,970,495 A | 11/1990 | Matsumoto et al. | |
| 5,006,856 A | 4/1991 | Benge et al. | |
| 5,012,225 A | 4/1991 | Gill | |
| 5,059,950 A | 10/1991 | Perchak | |

(Continued)

FOREIGN PATENT DOCUMENTS

AU 2003269120 A1 4/2004

(Continued)

OTHER PUBLICATIONS

Günter Karjoth, Paul Moskowitz; *Disabling RFID Tags With Visible Confirmjation: Clipped Tags Are Silenced*; IBM Research Report, Aug. 31, 2005; RC23710 (WO508-164); IBM Research Division.

*Primary Examiner* — Van T. Trieu
(74) *Attorney, Agent, or Firm* — Alston & Bird LLP

(57) ABSTRACT

A device for deactivating an RFID portion on an identification tag and indicating that the RFID portion is deactivated. The present invention addresses current privacy concerns regarding potential use of RFID technology after the point of sale. The device for deactivating the RFID portion of an identification tag provides visual indication that the RFID portion is deactivated. The visual indication occurs without the use of additional equipment or electronics. The visual indication component of the present invention is easy to interpret, so that a viewer will be able to quickly determine whether the RFID portion of the identification tag has been deactivated.

21 Claims, 25 Drawing Sheets

U.S. PATENT DOCUMENTS

| | | | |
|---|---|---|---|
| 5,081,445 A | 1/1992 | Gill et al. | |
| 5,108,822 A | 4/1992 | Imaichi et al. | |
| 5,142,270 A | 8/1992 | Appalucci et al. | |
| 5,182,062 A | 1/1993 | Lee et al. | |
| 5,432,499 A | 7/1995 | Montean | |
| 5,493,275 A | 2/1996 | Easter | |
| 5,537,105 A | 7/1996 | Marsh et al. | |
| 5,557,280 A | 9/1996 | Marsh et al. | |
| 5,599,046 A | 2/1997 | Behm et al. | |
| 5,624,514 A | 4/1997 | Frowein | |
| 5,680,106 A | 10/1997 | Schrott et al. | |
| 5,680,459 A | 10/1997 | Hook et al. | |
| 5,699,066 A | 12/1997 | Marsh et al. | |
| 5,714,935 A | 2/1998 | Ryan, Jr. | |
| 5,739,754 A | 4/1998 | Schrott et al. | |
| 5,844,485 A | 12/1998 | Ryan, Jr. | |
| 5,920,262 A | 7/1999 | Copeland | |
| 5,963,144 A | 10/1999 | Kruest | |
| 5,995,017 A | 11/1999 | Marsh et al. | |
| 5,997,044 A | 12/1999 | Behm et al. | |
| 6,025,780 A | 2/2000 | Bowers et al. | |
| 6,031,458 A * | 2/2000 | Jacobsen et al. | 340/572.5 |
| 6,087,940 A * | 7/2000 | Caperna et al. | 340/572.5 |
| 6,104,281 A | 8/2000 | Heinrich et al. | |
| 6,226,619 B1 | 5/2001 | Halperin et al. | |
| 6,373,387 B1 | 4/2002 | Qiu et al. | |
| 6,502,005 B1 | 12/2002 | Wrubel et al. | |
| 6,544,926 B1 | 4/2003 | Bodmer et al. | |
| 6,577,275 B2 | 6/2003 | Turner | |
| 6,585,154 B1 | 7/2003 | Ostrover et al. | |
| 6,696,953 B2 | 2/2004 | Qiu et al. | |
| 6,859,485 B2 | 2/2005 | Belcher | |
| 6,890,592 B2 | 5/2005 | Seehafer et al. | |
| 7,017,807 B2 | 3/2006 | Kipp et al. | |
| 7,109,867 B2 | 9/2006 | Forster | |
| 7,168,626 B2 | 1/2007 | Lerch et al. | |
| 7,206,010 B2 | 4/2007 | Maghakian | |
| 7,253,734 B2 | 8/2007 | Moskowitz | |
| 7,277,016 B2 | 10/2007 | Moskowitz et al. | |
| 7,323,993 B2 | 1/2008 | Fein et al. | |
| 7,400,298 B2 | 7/2008 | Fogg et al. | |
| 7,481,178 B2 * | 1/2009 | Laackmann | 116/216 |
| 2006/0017570 A1 | 1/2006 | Moskowitz et al. | |
| 2006/0055539 A1 | 3/2006 | Lawrence et al. | |
| 2006/0055540 A1 | 3/2006 | Lawrence et al. | |
| 2006/0061475 A1 | 3/2006 | Moskowitz et al. | |
| 2006/0092026 A1 | 5/2006 | Lawrence et al. | |
| 2006/0246984 A1 | 11/2006 | Walker et al. | |
| 2007/0024445 A1 | 2/2007 | Weslake et al. | |
| 2007/0229227 A1 | 10/2007 | Brown | |
| 2007/0252728 A1 | 11/2007 | Wisherd et al. | |
| 2009/0009288 A1 | 1/2009 | Fogg | |

FOREIGN PATENT DOCUMENTS

| | | |
|---|---|---|
| GB | 2 393 076 A | 3/2004 |
| GB | 2 409 615 A | 6/2005 |
| TW | 0396326 B | 7/2000 |
| WO | WO 2004/025554 A1 | 3/2004 |
| WO | WO 2005/024595 A2 | 3/2005 |

* cited by examiner

VISUAL IDENTIFICATION TAG DEACTIVATION

CROSS-REFERENCE TO RELATED APPLICATIONS

The present application is a Continuation of U.S. patent application Ser. No. 11/954,746, filed Dec. 12, 2007, now U.S. Pat. No. 7,701,345, which application is a Continuation of U.S. patent application Ser. No. 11/190,646, filed Jul. 27, 2005, now U.S. Pat. No. 7,327,261. The disclosures of the referenced applications are incorporated herein by reference.

FIELD OF THE INVENTION

The present invention is directed to automatic identification devices and more specifically to providing a visual indication of the dynamic state of an identification device, such as an RFID device.

BACKGROUND OF THE INVENTION

The use of Electronic Article Surveillance, Radio Frequency Identification, and electronic security tag technology (hereinafter collectively referred to as 'RFID') is becoming increasingly prevalent in manufacturing, inventory control, retail and residential settings. First used in the Battle of Britain to recognize friendly fighter planes, RFID technology is now emerging as a valuable tool in our everyday lives. For example, RFID technology can be used by manufacturers or retailers to instantaneously track product inventories and thereby adjust to specific inventory needs. Similarly, RFID technology can be used by automobile commuters to pay highway tolls without interrupting their commute. RFID technology can also be used by pet owners to provide reassurance that pets are readily locatable, regardless of lost collars.

RFID technology involves the transmission of information through radio waves. A typical RFID system includes an RFID tag and an RFID reader/encoder. The RFID tag includes a circuit chip and an antenna attached to the circuit chip. The circuit chip and antenna are generally thin, flexible, and mounted to a flexible dielectric substrate. Antennas have numerous configurations and each is structured generally to broadcast electromagnetic energy to a distant reader. RFID chips can be programmed to store a variety of information. For example, RFID chips often include retail product identification such as a product serial number. In other applications, relatively more complex information may be provided such as biometric information on an employee ID badge.

RFID technology provides efficient, instantaneous communication between a reader and an RFID tag without directed near-field scanning as is commonly required in more conventional automatic identification technologies (e.g., barcode, optical scanning, etc.). Further, the cost of RFID technology has recently dropped making it particularly useful in open supply chain applications, where disposable identification technologies are desired. However, in spite of these benefits, and perhaps because of them, RFID technology has produced discomfort, fear, and paranoia in some consumers.

Many consumers fear that RFID technology could be used in an Orwellian manner. For example, some consumers are wary that retailers may use RFID tags to covertly track consumer purchasing habits, interests, or behavior by placing hidden RFID readers throughout a retail location such as a shopping center. The readers could detect RFID tags provided in various previously purchased articles (e.g., wallets, purses, clothing, etc.) located on the consumer's body or in the consumer's possession, thereby remotely tracking, logging, and analyzing the consumer's movements as they proceed through the shopping center. Although potentially benefiting retailers in terms of understanding, for example, which retail displays are effective at drawing consumer interest, many consumers view the above use of RFID technology as an unwarranted invasion of privacy. Accordingly, consumer groups have mobilized to prevent such use of RFID technology. Such groups have strongly discouraged use of RFID technology and have, in some cases, proposed legislation aimed at requiring retail stores employing RFID technology to install equipment that allows consumers to disable or deactivate RFID tags.

In view of both the consumer objections referenced above, and the increasing use of RFID technology in manufacturing, inventory control, retail and residential settings, there is a need for a device associated with an RFID tag that is capable of deactivating the RFID tag in a manner that is visually apparent to a consumer or other viewer. Such a device should be simple, economical, efficient, and should ensure deactivation to the satisfaction of the consumer or other viewer.

BRIEF SUMMARY OF THE INVENTION

The present invention addresses the above needs by providing a device for deactivating identification tags in a permanent and visually perceptive manner. The deactivation may occur manually or with the use of a deactivation device, and the visual indication occurs without use of additional equipment or electronics. Such visual indication is easy to interpret, so that a person viewing it will be able to quickly determine whether the identification tag is active or has been disabled. Identification tags capable of visually indicating this state (i.e., active or disabled) according to various embodiments of the present invention are simple, economical, efficient, and capable of wide use with many different products.

In general, the present invention provides an identification tag for visually indicating deactivation of at least a part of an electronic circuit portion of the identification tag. The electronic circuit portion stores an identification associated with the identification tag, and a deactivation indicating portion is capable of visually indicating deactivation of at least a part of the electronic circuit portion. The visual indication may be an indicating color or an indicating indicia, and may occur under normal or alternate lighting conditions.

In other specific embodiments, the electronic circuit portion may be placed between two layers such that when the layers are separated, as when a user manipulates one of the layers or uses a tool or other mechanism to at least partially separate the layers, at least a part of the electronic circuit portion of the identification tag is deactivated. A deactivating indicating portion then visually indicates, such as through an indicating color or indicia, that at least a part of the electronic portion has been deactivated.

An identification tag of another embodiment of the present invention may be deactivated by removing a coating that is adjacent to an electronic circuit portion such that at least a part of the electronic circuit portion is deactivated. The process of removing the coating then reveals a visual indication of deactivation.

An identification tag of still another embodiment of the present invention may be deactivated using a pull-tab assembly that is designed to deactivate at least a part of an electronic circuit portion when the pull-tab assembly is removed from the identification tag. The process of removing the pull-tab triggers a deactivation indicating portion, which may be a two-part color generating system that results in visual indication of the deactivation.

Thus, the present invention provides a device for deactivating an RFID portion of an identification tag and indicating that the RFID portion is deactivated. The device for deactivating the RFID portion provides visual indication that the RFID portion is deactivated. The visual indication occurs without the use of additional equipment or electronics and it is easy to interpret, so that a viewer will be able to quickly determine whether the RFID portion of the identification tag has been deactivated.

BRIEF DESCRIPTION OF THE DRAWINGS

Figure 1:
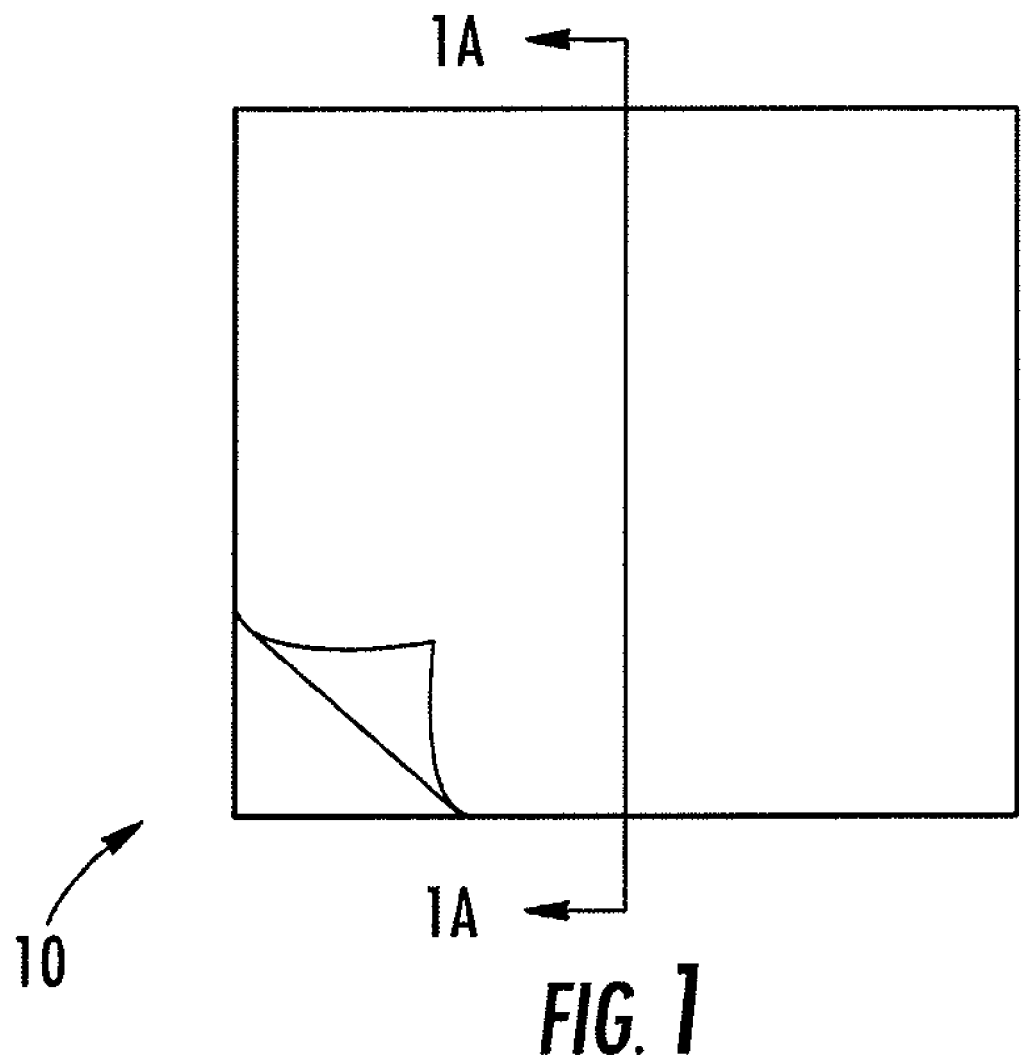
Figure 1A:
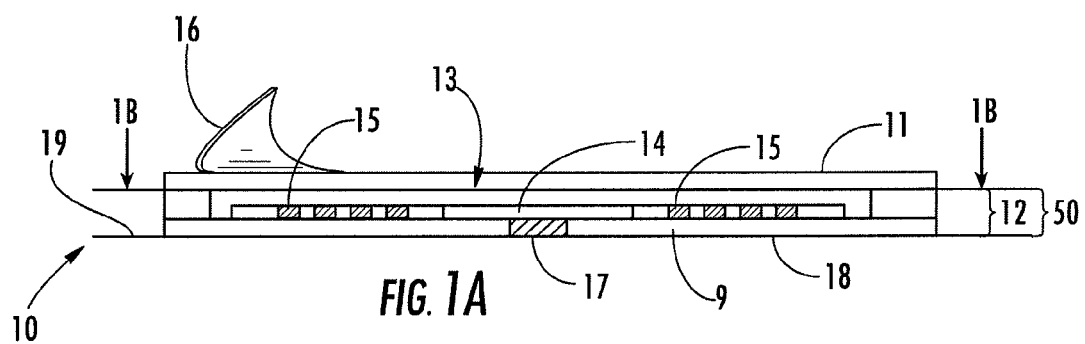
Figure 1B:
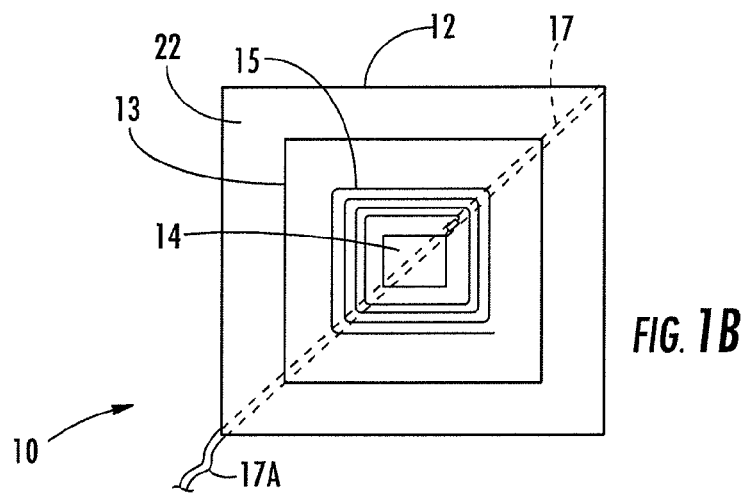
Figure 1C:
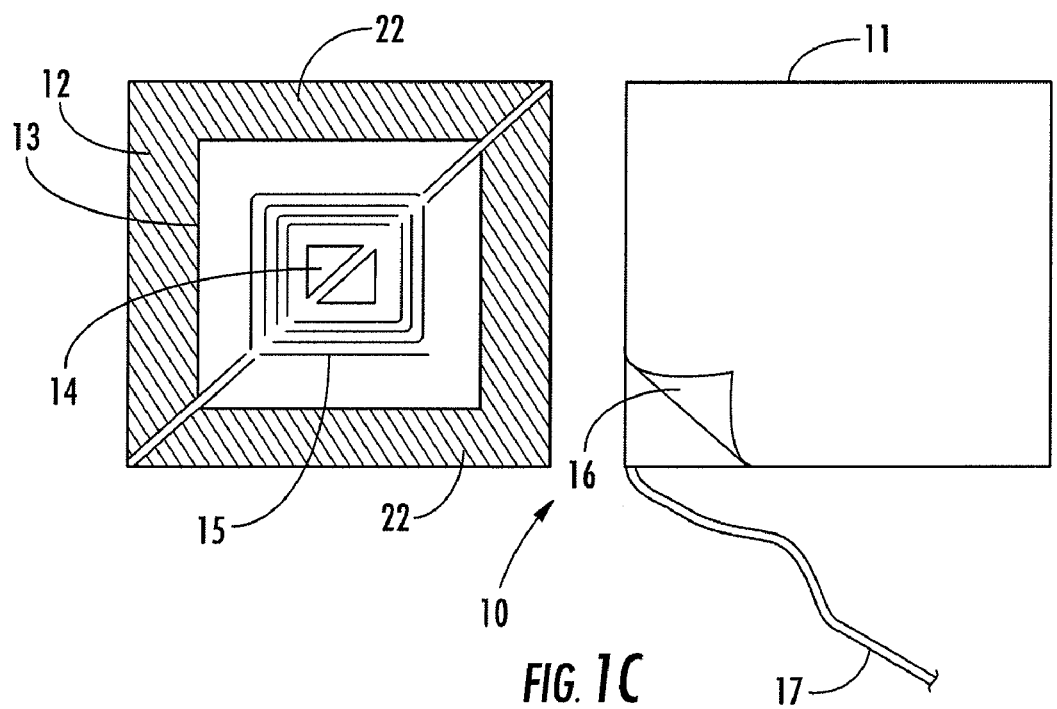
Figure 2:
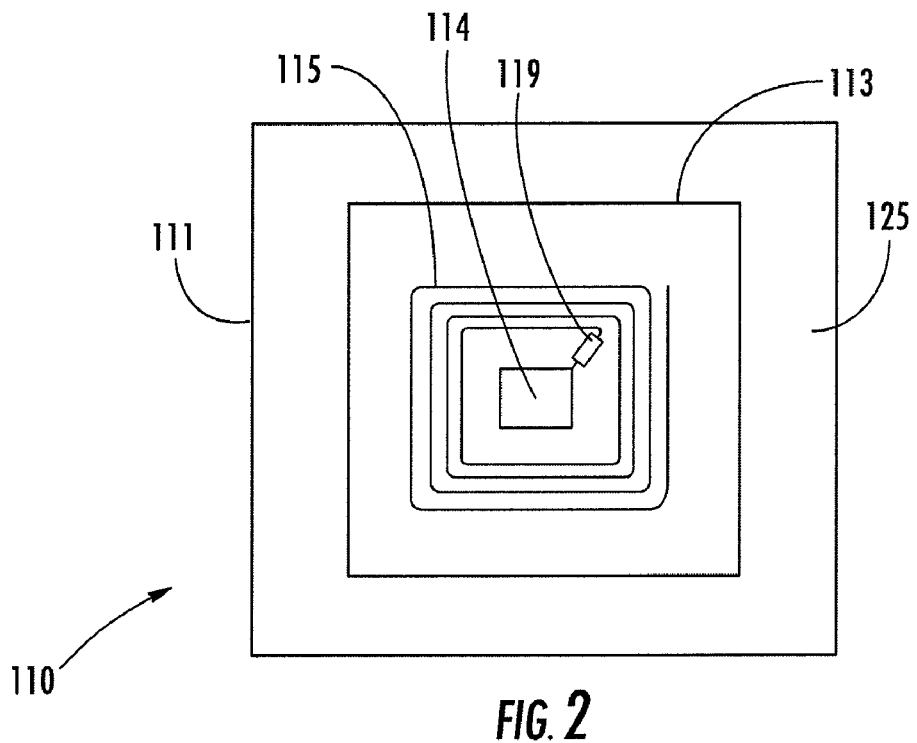
Figure 2A:
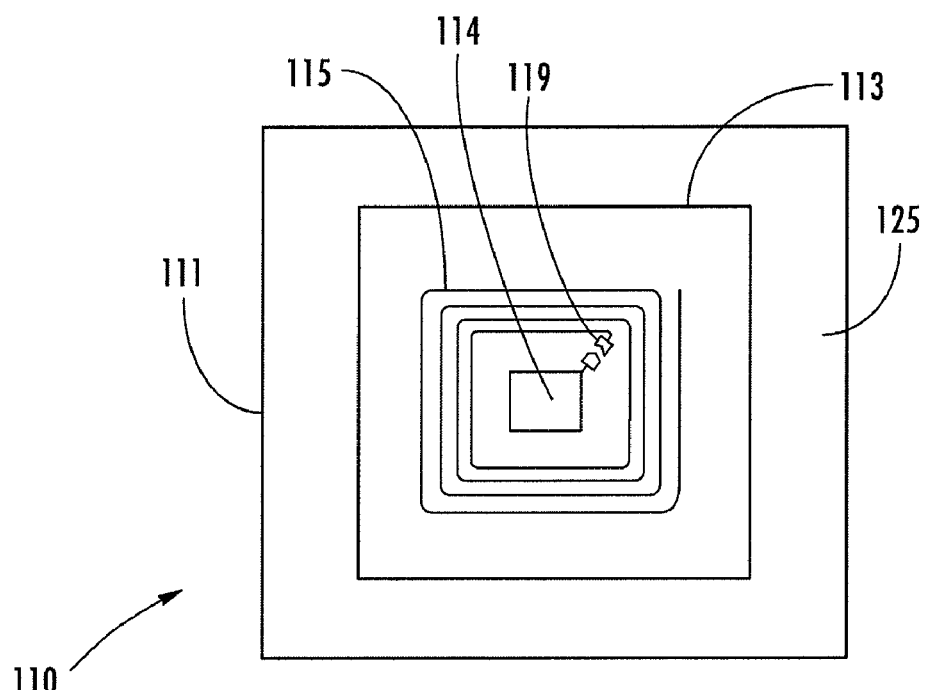
Figure 2B:
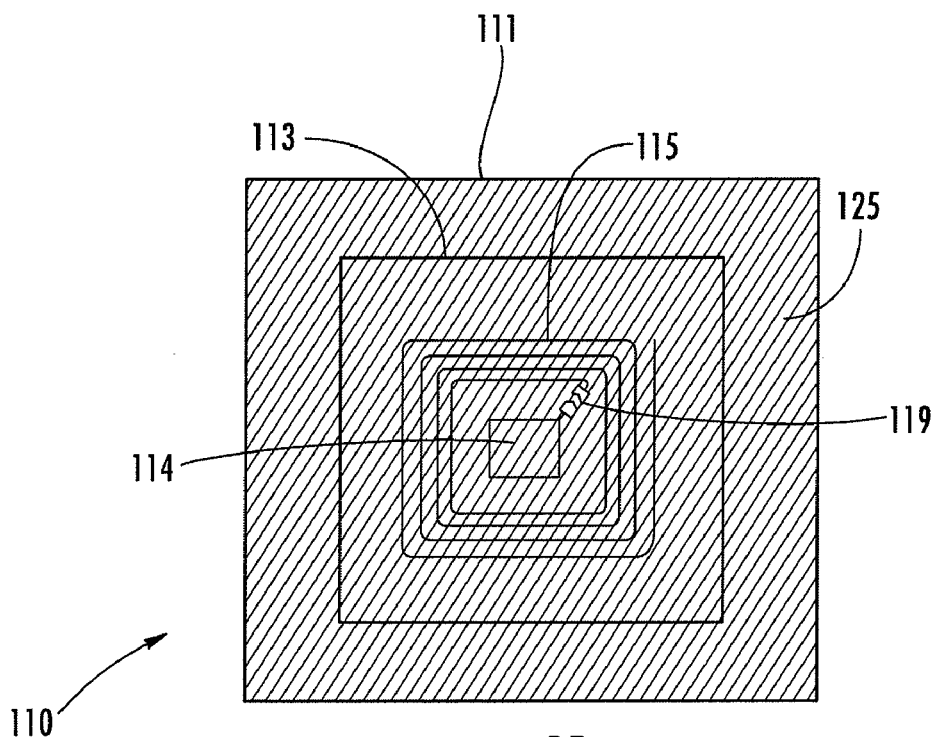
Figure 3:
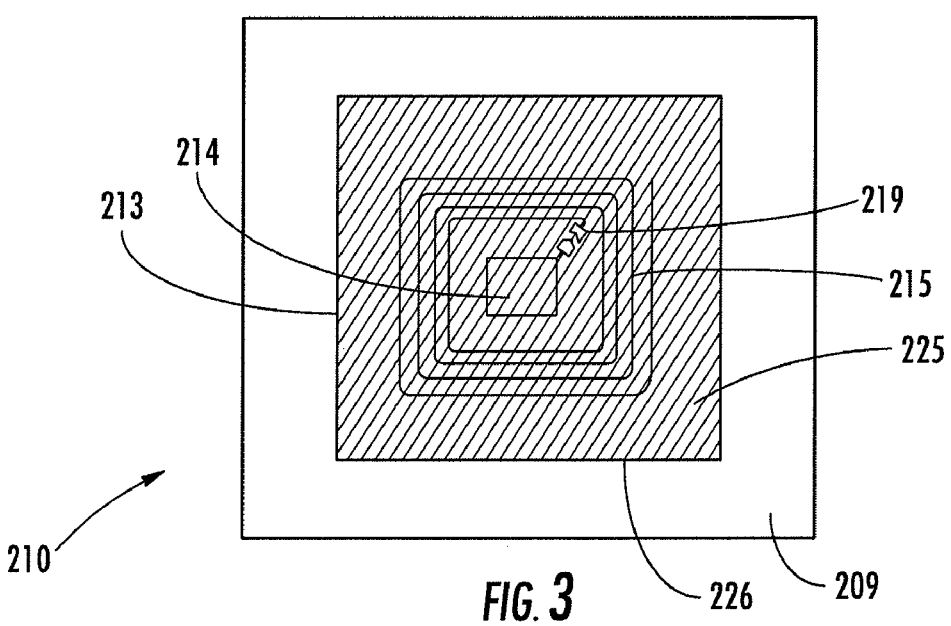
Figure 4:
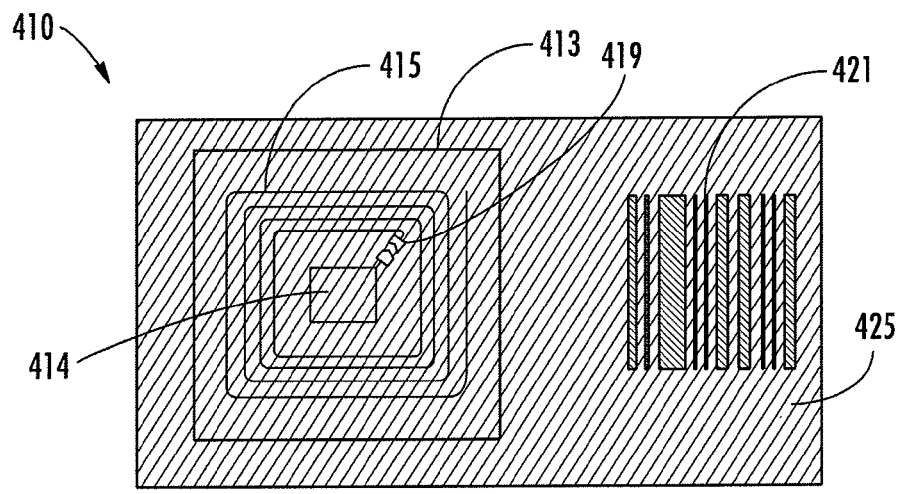
Figure 5:
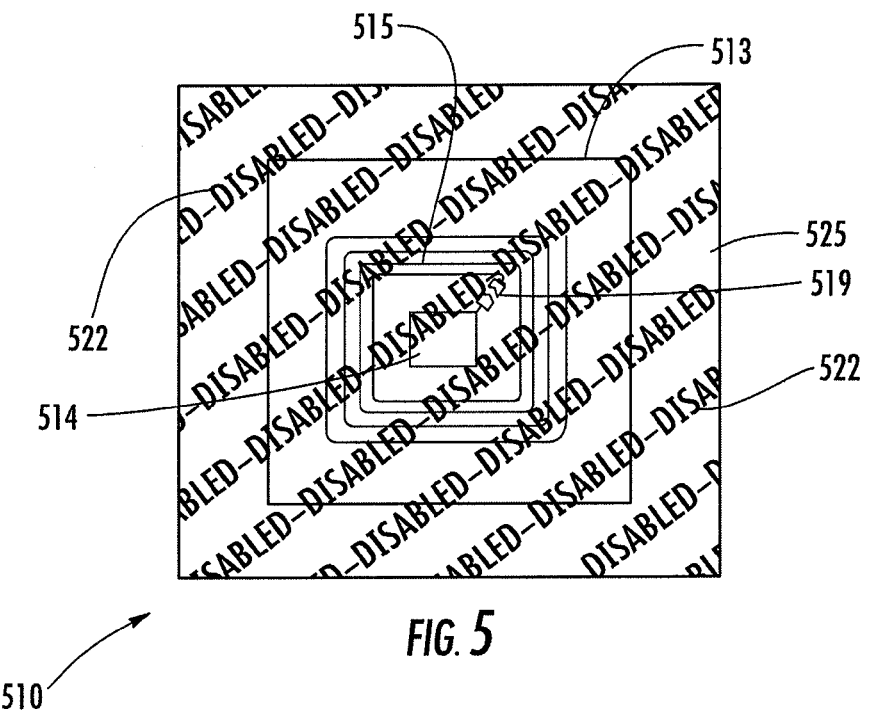
Figure 6:
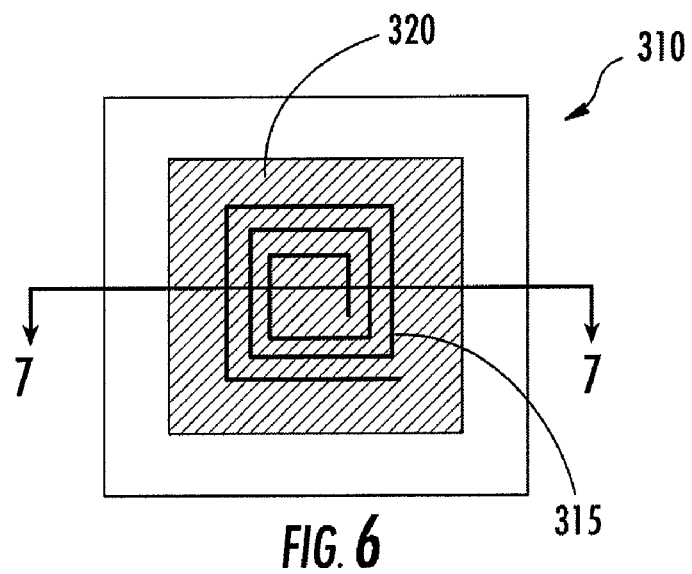
Figure 6A:
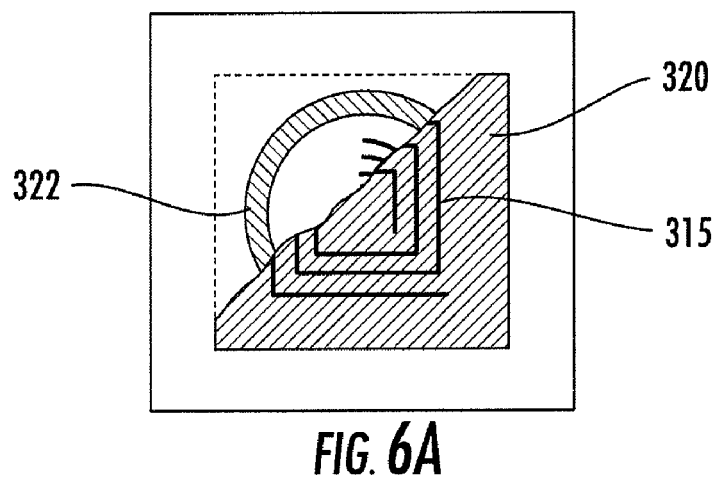
Figure 6B:
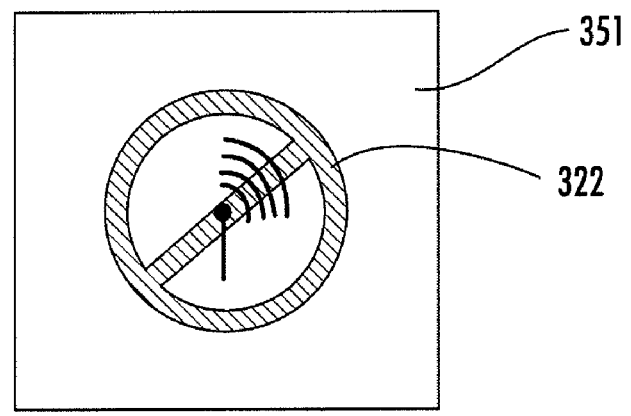
Figure 7:
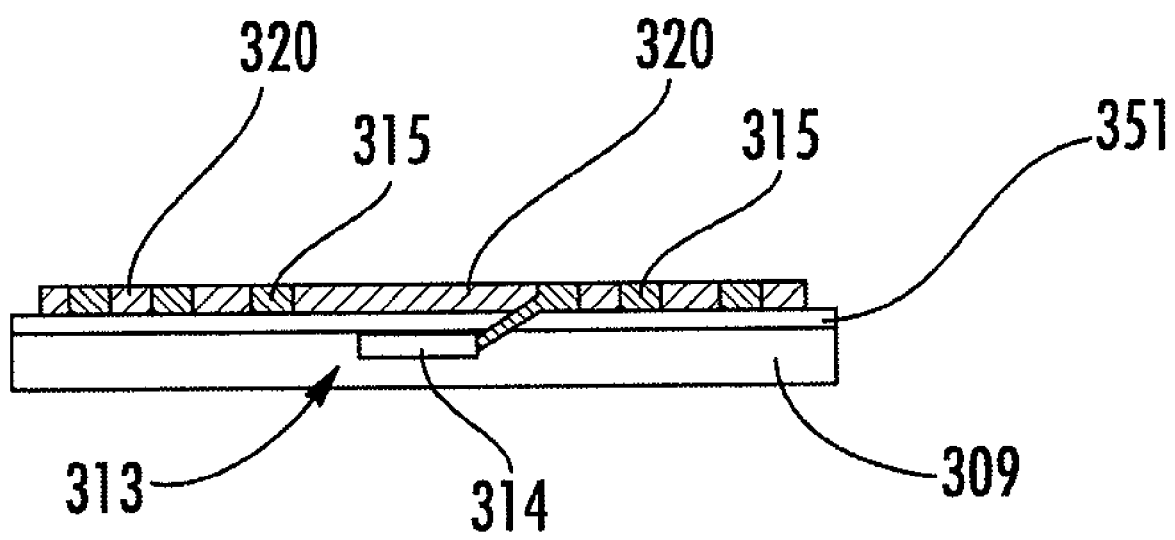
Figure 8:
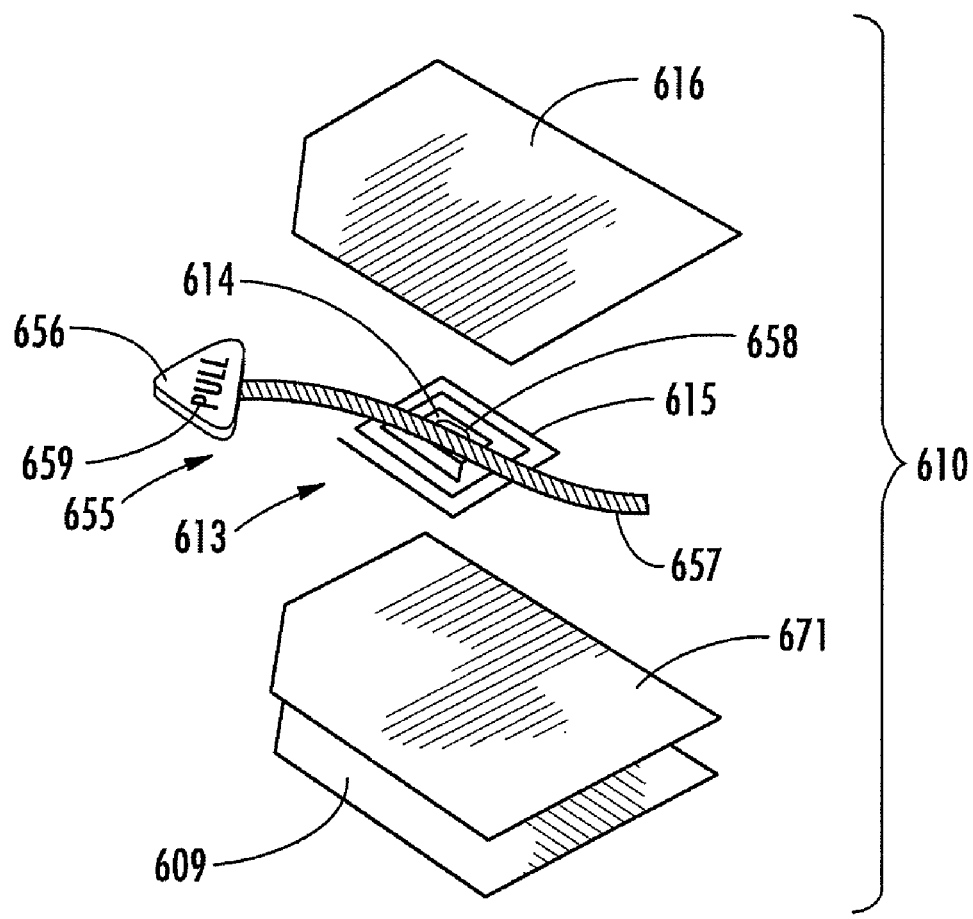
Figure 9:
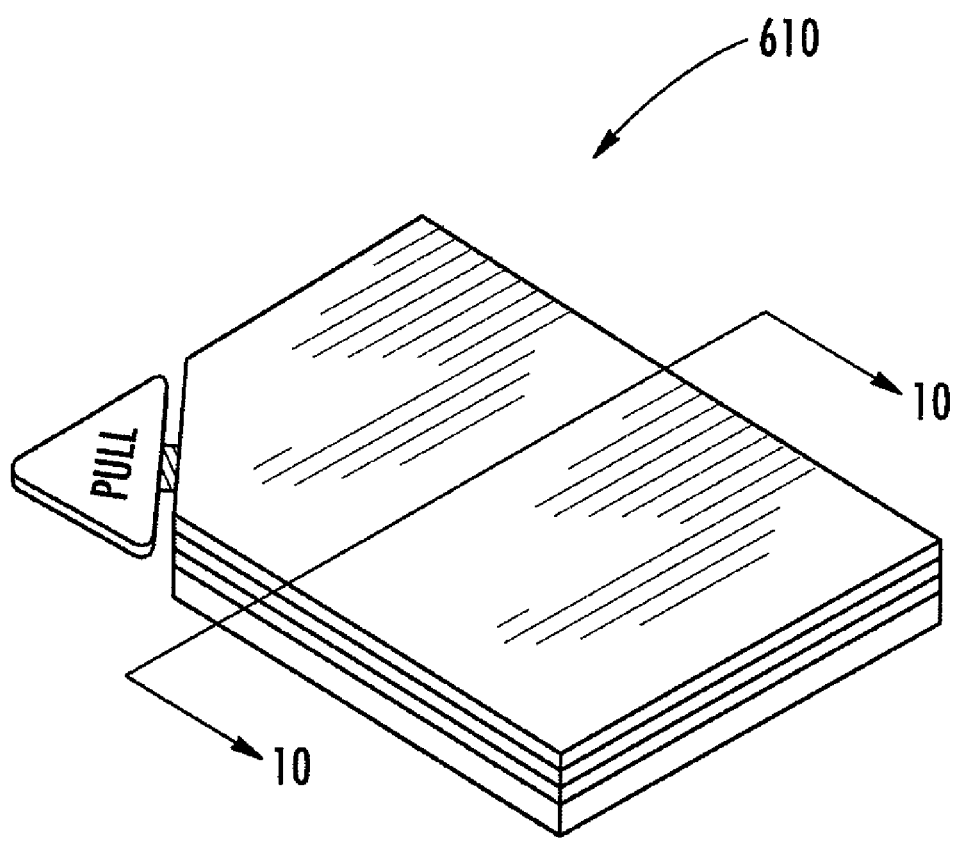
Figure 10:
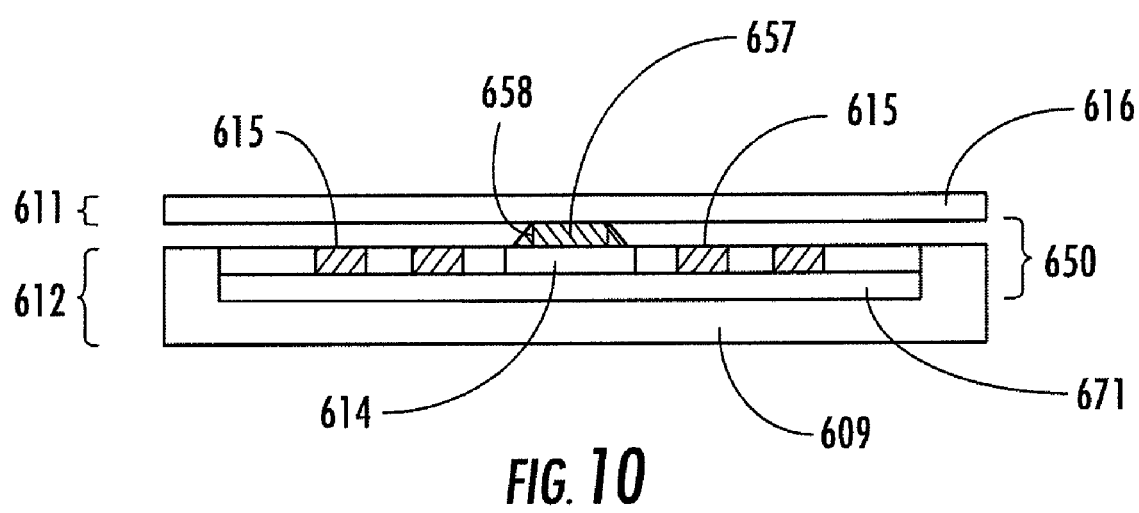
Figure 11:
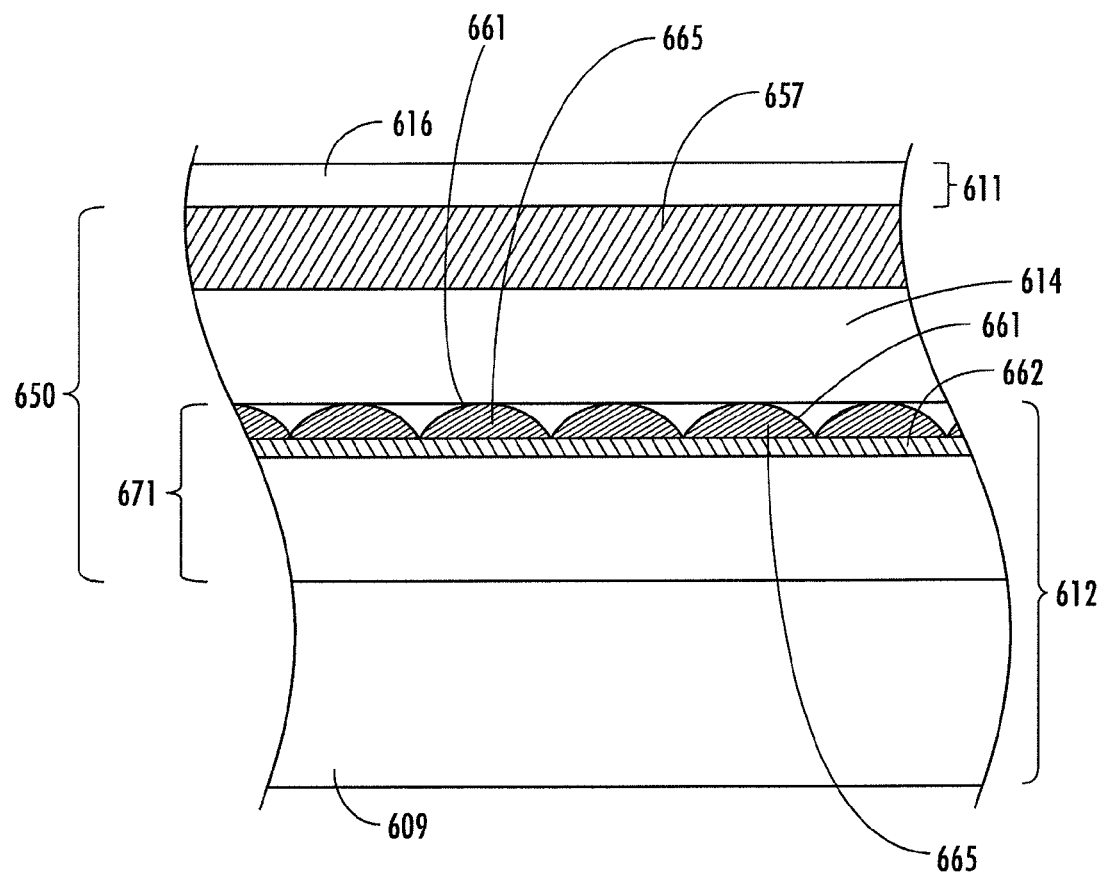
Figure 12:
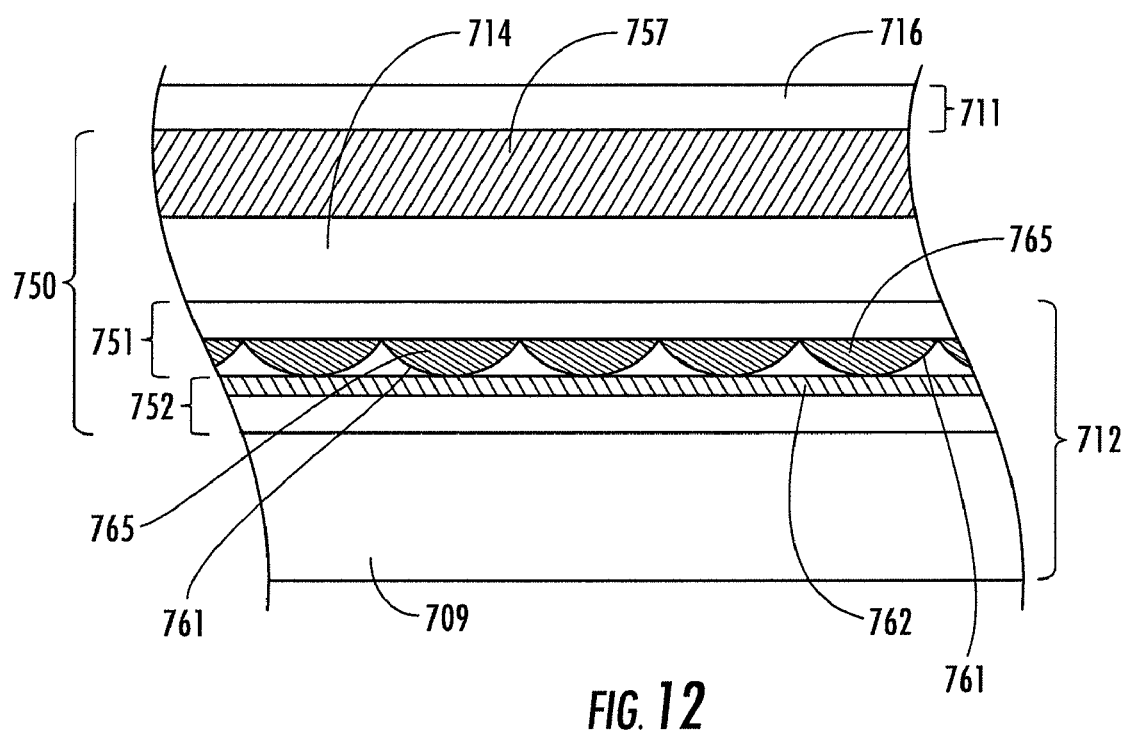
Figure 13:
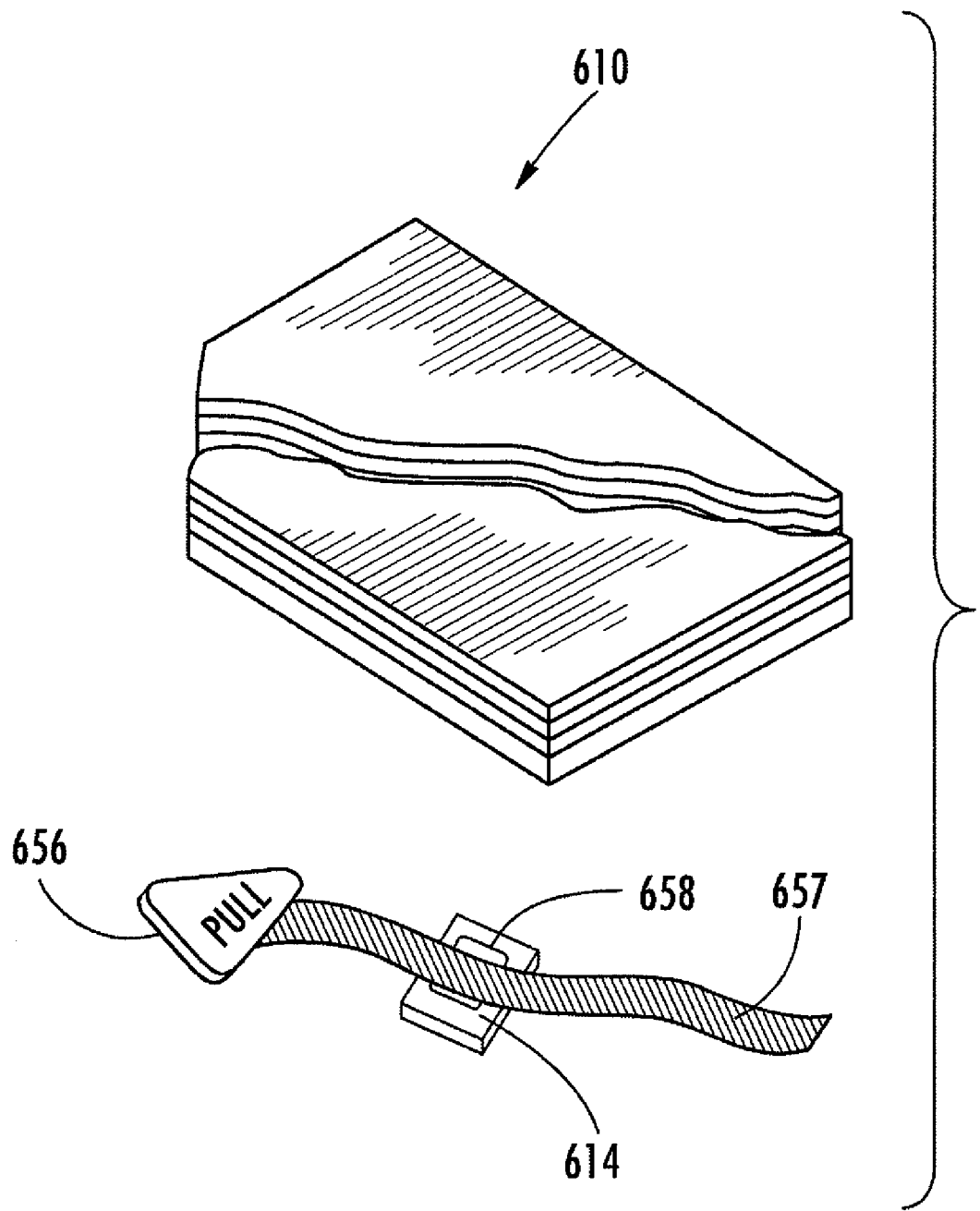
Figure 14:
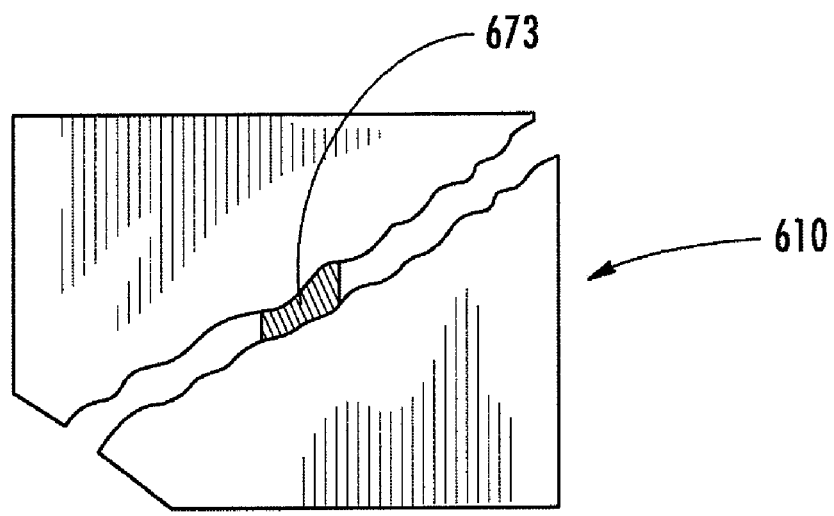
Figure 15:
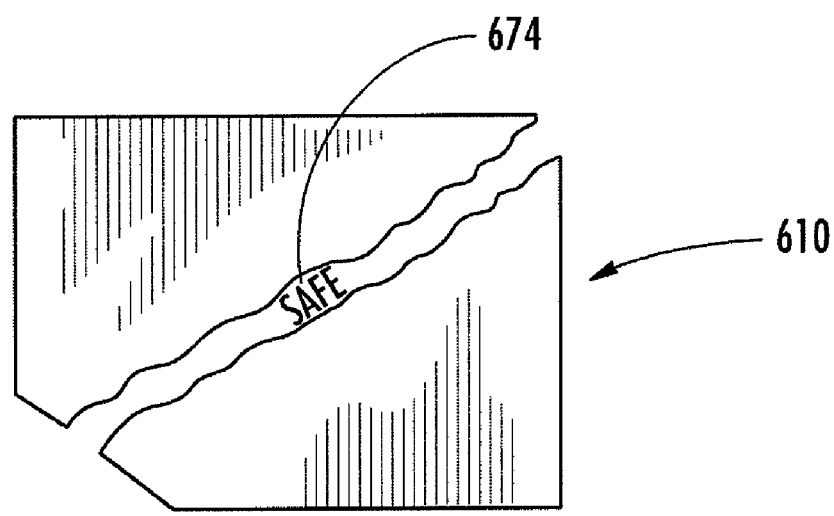
Figure 16:
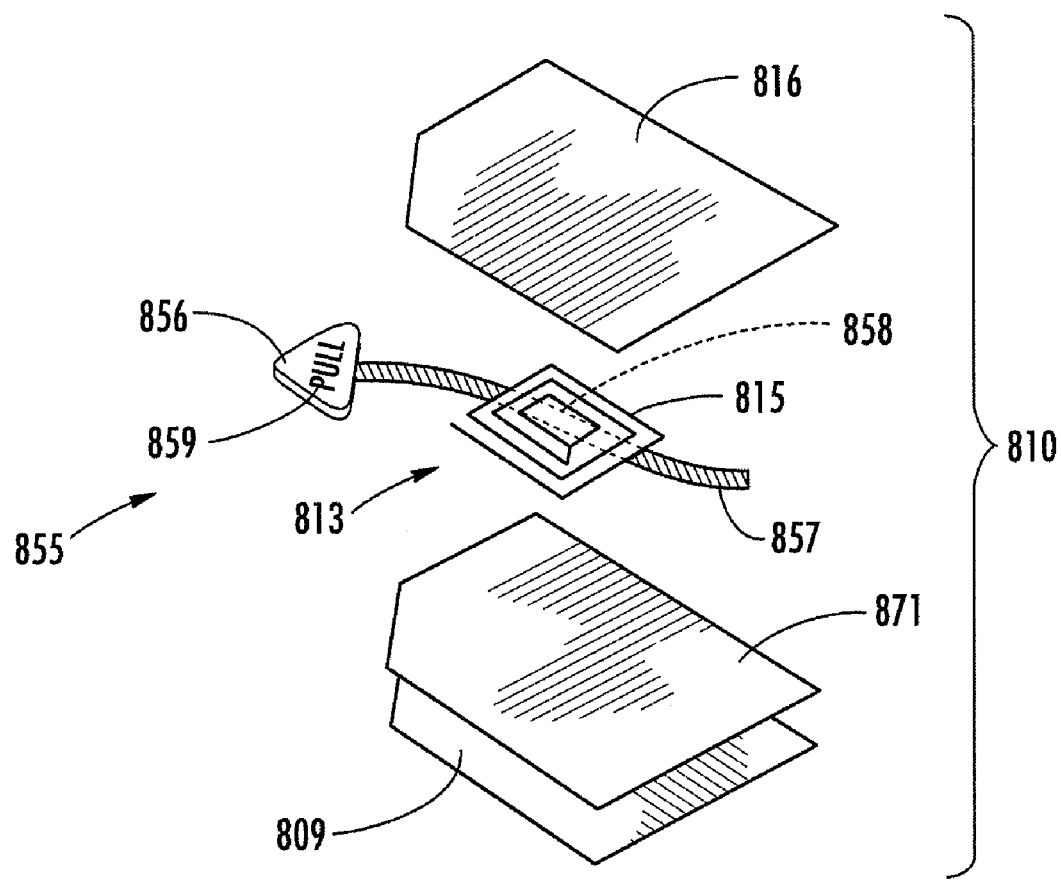
Figure 17:
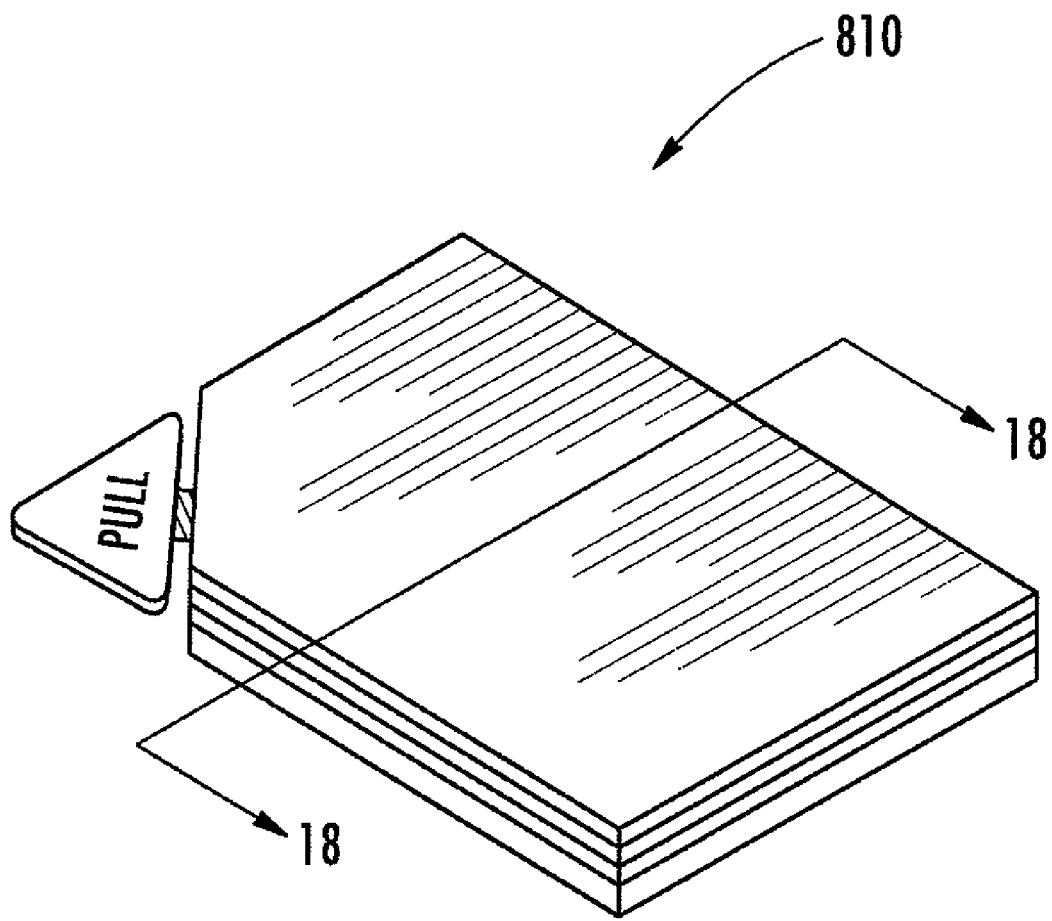
Figure 18:
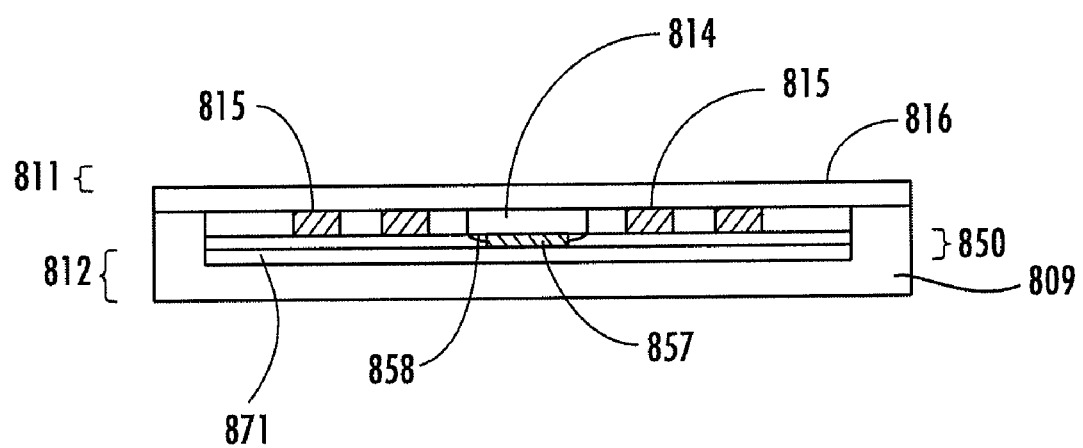
Figure 19:
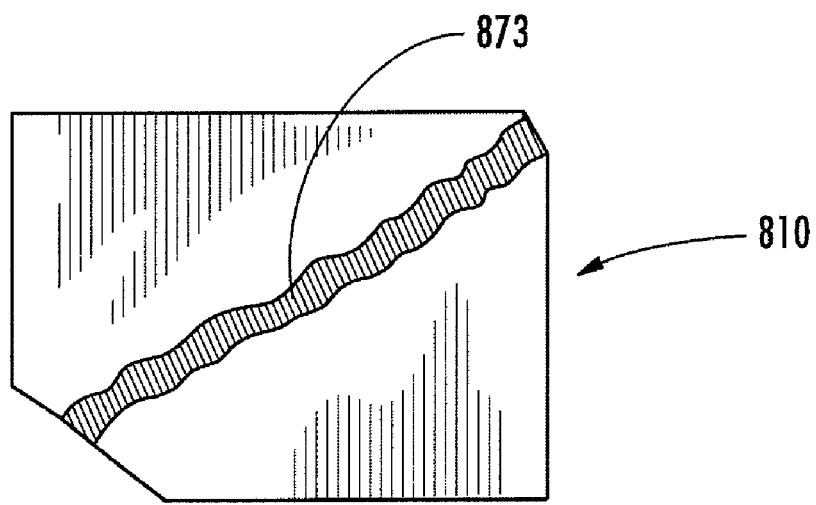
Figure 20:
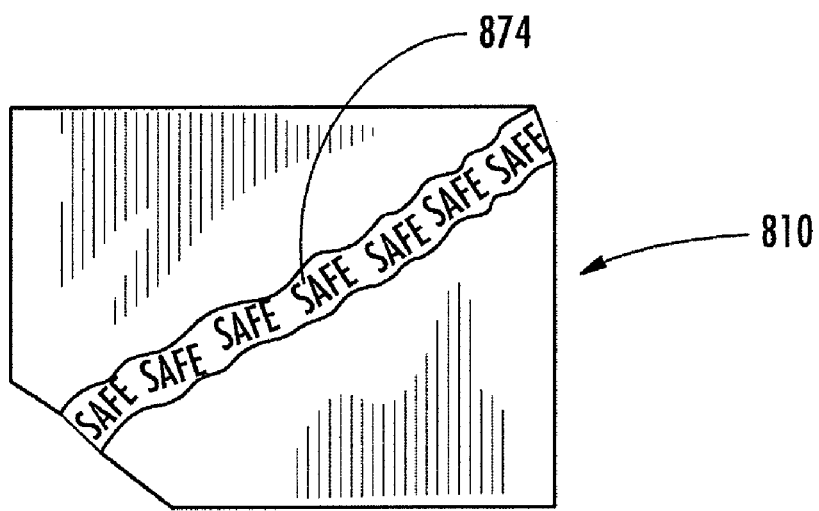
Figure 21:
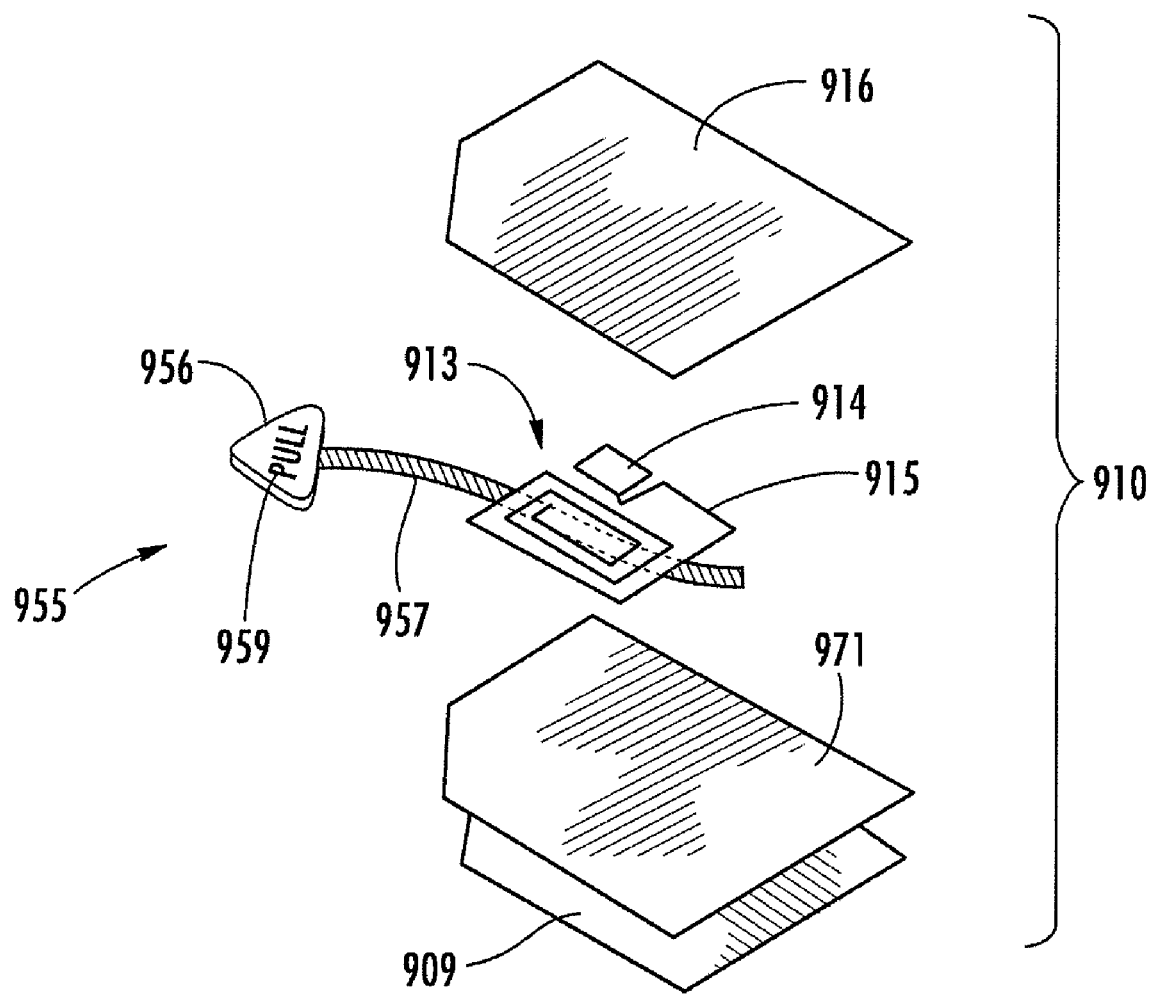
Figure 22:
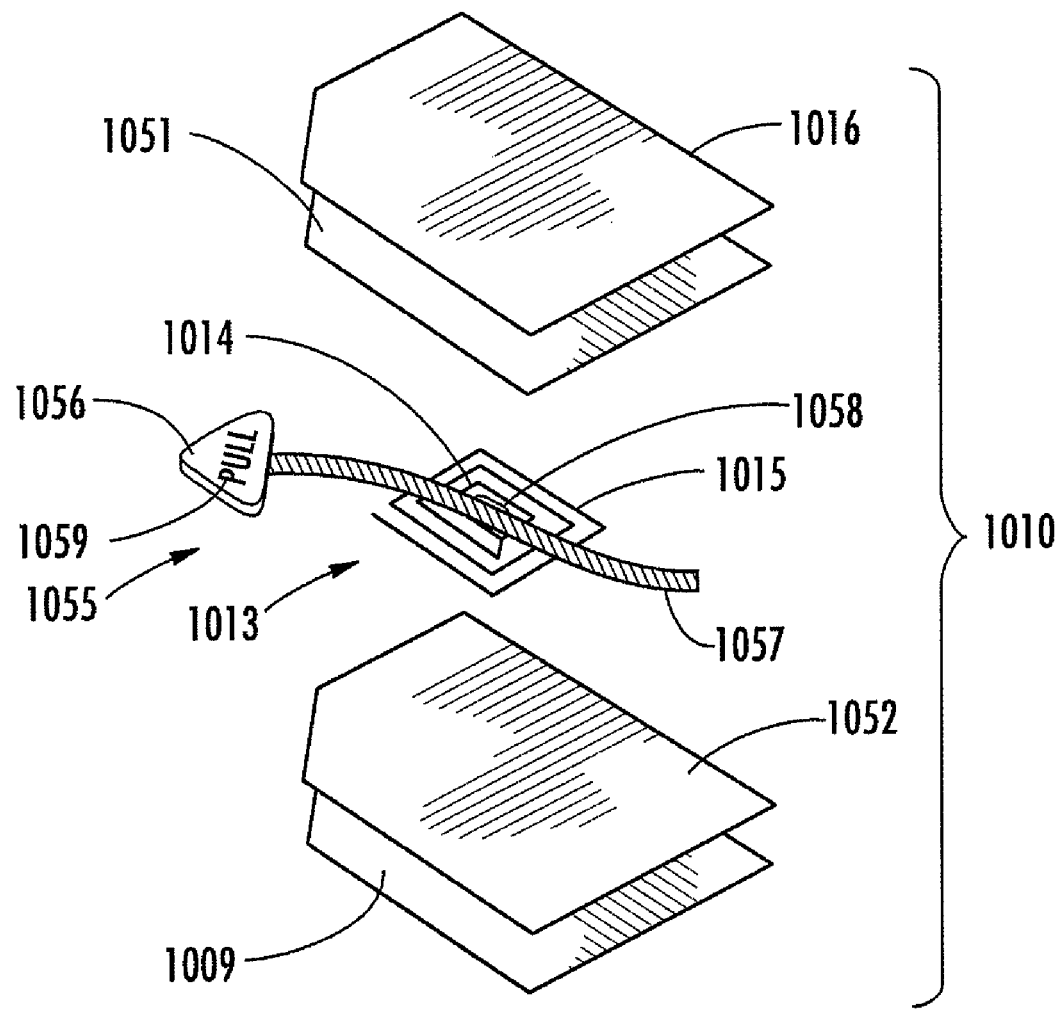
Figure 23:
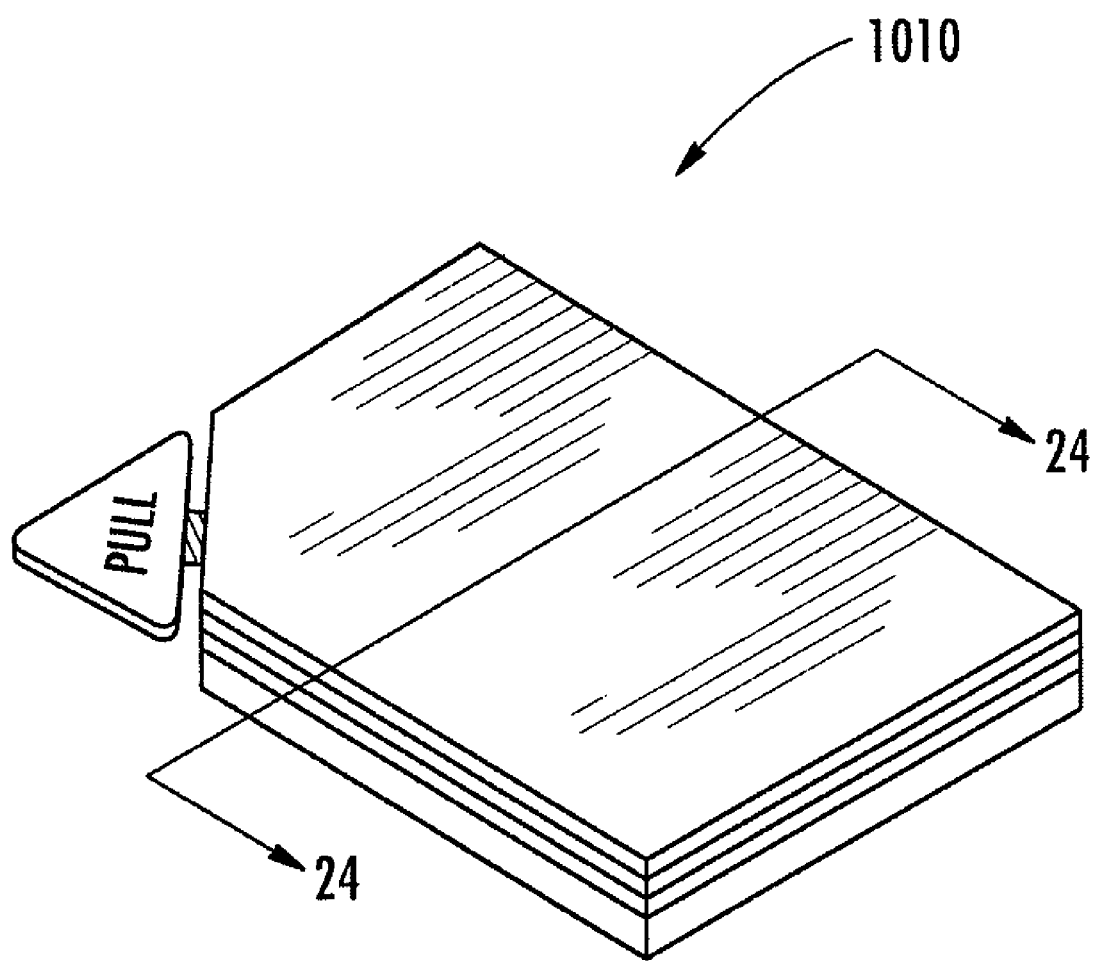
Figure 24:
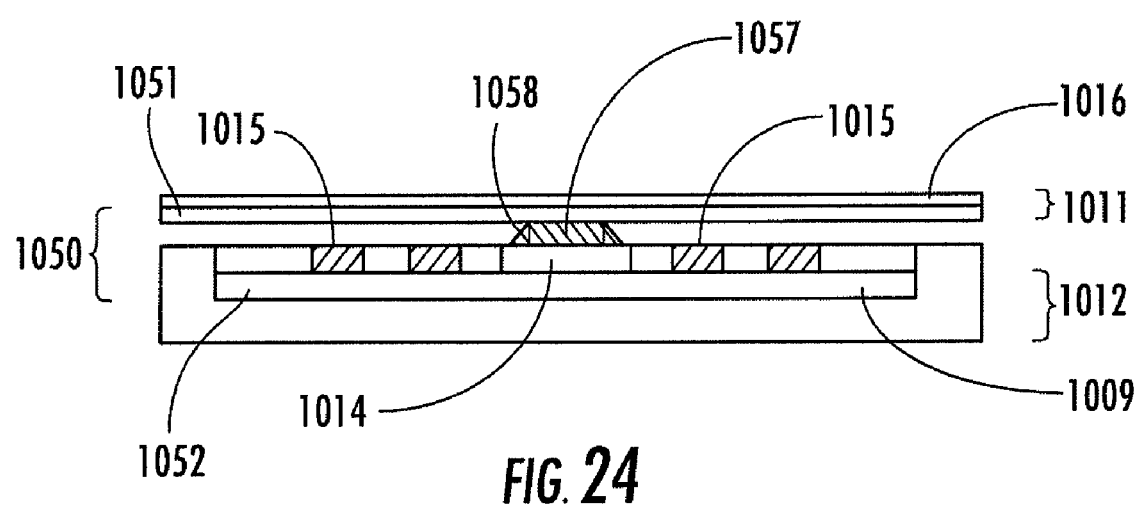
Figure 25:
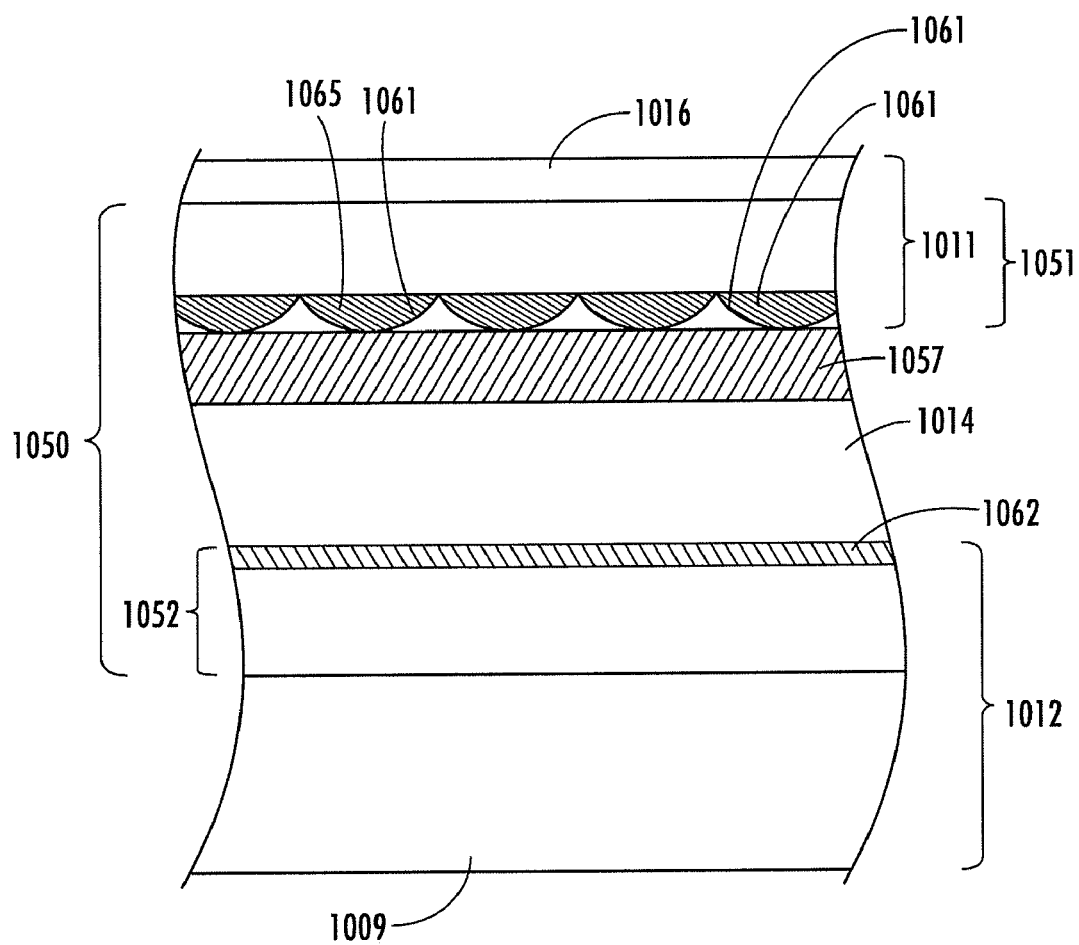
Figure 26:
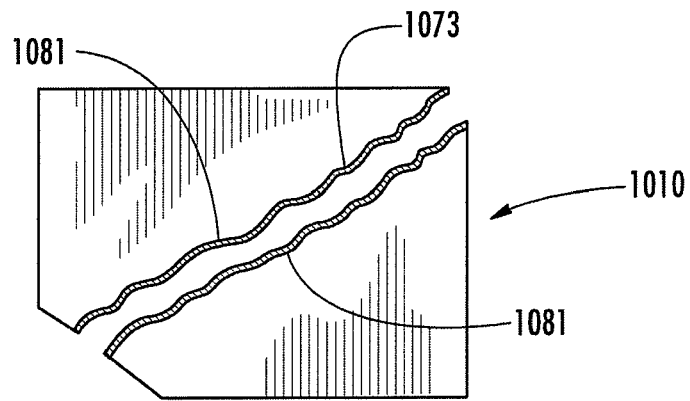
Figure 27:
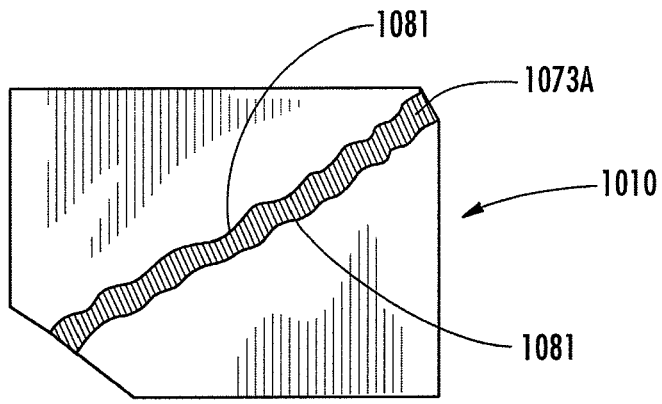
Figure 28:
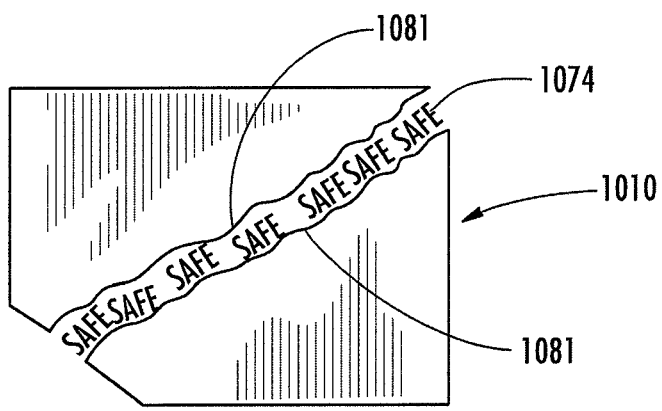

Having thus described the invention in general terms, reference will now be made to the accompanying drawings, which are not necessarily drawn to scale, and wherein:

FIG. 1 is a top view of an identification tag capable of visually detectable deactivation of an RFID portion in accordance with one embodiment of the present invention;

FIG. 1A is a cross sectional view of the identification tag depicted in FIG. 1;

FIG. 1B is a cross sectional view of the identification tag depicted in FIG. 1A;

FIG. 1C is a top view of the identification tag of FIG. 1, wherein the RFID portion is visually deactivated by separating a first layer from a second layer;

FIG. 2 is a top view of an identification tag capable of visually detectable deactivation of an RFID portion in accordance with another embodiment of the present invention;

FIG. 2A is a top view of the identification tag depicted in FIG. 2, wherein the RFID portion is deactivated;

FIG. 2B is a top view of the identification tag depicted in FIG. 2, wherein the RFID portion is deactivated and wherein such deactivation is visually detectable;

FIG. 3 is a top view of an identification tag capable of visually detectable deactivation of an RFID portion in accordance with another embodiment of the present invention;

FIG. 4 shows a top view of an identification tag capable of visually detectable deactivation of an RFID portion in accordance with another embodiment of the present invention;

FIG. 5 shows a top view of an identification tag capable of visually detectable deactivation of an RFID portion in accordance with another embodiment of the present invention;

FIG. 6 shows a top view of an identification tag capable of visually detectable deactivation of an RFID portion in accordance with another embodiment of the present invention;

FIG. 6A shows a top view of the identification tag depicted in FIG. 6, wherein part of a removable coating has been removed;

FIG. 6B shows a top view of the identification tag depicted in FIG. 6, wherein the RFID portion is deactivated and wherein such deactivation is visually detectable;

FIG. 7 shows a cross sectional view of the identification tag depicted in FIG. 6;

FIG. 8 shows an exploded perspective view of an identification tag capable of visually detectable deactivation of an RFID portion in accordance with another embodiment of the present invention;

FIG. 9 shows a perspective view of the identification tag depicted in FIG. 8;

FIG. 10 shows a cross sectional view of the identification tag depicted in FIG. 9;

FIG. 11 shows a detail cross sectional view of a central portion of the identification tag depicted in FIG. 10;

FIG. 12 shows a detail cross sectional view of a central portion of an identification tag capable of visually detectable deactivation of an RFID portion in accordance with another embodiment of the present invention;

FIG. 13 shows a perspective view of the identification tag depicted in FIG. 9, wherein the tape assembly has been removed to deactivate the RFID portion;

FIG. 14 shows a top view of the identification tag depicted in FIG. 13, wherein the RFID portion is deactivated and wherein such deactivation is visually detectable through an indicating color;

FIG. 15 shows a top view of the identification tag depicted in FIG. 13, wherein the RFID portion is deactivated and wherein such deactivation is visually detectable through an indicating indicia;

FIG. 16 shows an exploded perspective view of an identification tag capable of visually detectable deactivation of an RFID portion in accordance with another embodiment of the present invention;

FIG. 17 shows a perspective view of the identification tag depicted in FIG. 16;

FIG. 18 shows a cross sectional view of the identification tag depicted in FIG. 17;

FIG. 19 shows a top view of the identification tag depicted in FIG. 17, wherein the RFID portion has been deactivated and wherein such deactivation is visually detectable through an indicating color;

FIG. 20 shows a top view of the identification tag depicted in FIG. 17, wherein the RFID portion has been deactivated and wherein such deactivation is visually detectable through an indicating indicia;

FIG. 21 shows an exploded perspective view of an identification tag capable of visually detectable deactivation of a portion an antenna of an RFID portion in accordance with another embodiment of the present invention;

FIG. 22 shows an exploded perspective view of an identification tag capable of visually detectable deactivation an RFID portion in accordance with another embodiment of the present invention;

FIG. 23 shows a perspective view of the identification tag depicted in FIG. 22;

FIG. 24 shows a cross sectional view of the identification tag depicted in FIG. 23;

FIG. 25 shows a detail cross sectional view of a central portion of the identification tag depicted in FIG. 24;

FIG. 26 shows top view of the identification tag depicted in FIG. 23, wherein the RFID portion has been deactivated and wherein such deactivation is visually detectable through an indicating color;

FIG. 27 shows a top view of the identification tag depicted in FIG. 23, wherein the RFID portion has been deactivated and wherein such deactivation is visually detectable through another indicating color; and FIG. 28 shows a top view of the identification tag depicted in FIG. 23, wherein the RFID portion has been deactivated and wherein such deactivation is visually detectable through an indicating indicia.

DETAILED DESCRIPTION OF THE INVENTION

The present invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

The present invention provides a device for deactivating an RFID tag. The present invention also provides a visual indication that the RFID tag has been successfully deactivated. In one embodiment, the RFID tag deactivation and accompanying visual indication occur simultaneously, such that a user may verify that the RFID tag has indeed been deactivated. In other embodiments, however, it may be appropriate to introduce a delay between RFID tag deactivation and the visual indication of such deactivation. In either case, visual indication of deactivation according to various embodiments of the invention is easy to interpret, simple, economical, and accurate as will be apparent in view of the disclosure provided below.

Referring collectively to FIG. 1-1C, one embodiment of the present invention includes an identification tag 10 having a first layer 11 adhered to a deactivation indicating portion 50. In the depicted embodiment, the deactivation indicating portion 50 comprises a second layer 12. For purposes of the foregoing specification and appended claims the term "identification tag" refers to any system that includes a memory or identity and mechanism for communicating remotely with a reader/encoder, such as remotely detectable tags that incorporate RFID or other similar technologies. For example, identification tags may include EAS tags, magnetic tags, RFID tags, RFID labels, smart cards, optical communication tags, capacitive tags, and the like. In the depicted embodiment, the first layer 11 includes a tab 16 typically disposed at one corner. The tab 16 is comprised of a flap of material extending from a portion of the first layer 11 such that a user, or a deactivation device may manipulate the tab 16. In other embodiments, the tab 16 may be attached to a portion of the first layer 11. In the depicted embodiment, the second layer 12 of the identification tag 10 includes an RFID portion 13 having an antenna 15. The depicted antenna 15 is a single layer antenna disposed in a concentric pattern surrounding a circuit chip 14, however, in alternate embodiments, other antenna structures may be used including multi-layered antennas and antennas of any shape. The antenna 15 may be constructed by any method as is known in the art, such as by printing, etching, or by deposition.

It should be noted that the term deactivation device as used herein is defined as any material, device, mechanism, tool, and/or combinations of the above that disrupts the operability of the electrical circuit, either mechanically or otherwise. The deactivation device may include, but is not limited to "tear tapes", severing cords, fuses, and rudimentary tools. The deactivation device may also include attachment of a portion of the electrical circuit to one component and another portion of the electrical circuit to another component, where the other component is separable from the first component.

In various embodiments, the second layer 12 of the identification tag 10 may include an adhesive (not shown) on a bottom surface 18 for securing the identification tag 10 to a retail product or other item 19. In one embodiment, the first layer 11 may be adhered to the second layer 12 by a second adhesive (not shown) that is less aggressive than the first adhesive such that the first layer 11 may be separated from the second layer 12 without removing the second layer 12 from the item 19. It should be noted that in other embodiments, a patterned adhesive could be used so as to provide tamper evidencing.

FIG. 1B shows the identification label 10 having the first layer 11 peeled away from the second layer 12. In one embodiment, a severing device, such as a cord 17, is located adjacent to at least a part of the RFID portion 13 of the identification tag 10. More particularly, in the depicted embodiment, the severing cord 17 is disposed beneath the circuit chip 14 and antenna 15 as shown. In alternate embodiments, however, the severing cord 17 may pass exclusively beneath either the antenna or circuit chip (not shown). Also, the severing cord 17 may be embedded in a dielectric substrate 9 that supports the RFID portion 13 as shown. In alternate embodiments, the severing cord 17 may be fixed beneath the RFID portion 13 by an adhesive or other coating.

In the depicted embodiment, the severing cord 17 is constructed of nylon similar to a fishing line; however, in alternate embodiments, the severing cord may be constructed of such materials as plastics, polymers such as polypropylene, metal wire, fiber strings, woven nylon, Mylar®, paper, or other strong materials. In other embodiments, the severing cord 17 may comprise the antenna 15. In various embodiments, a first end 17A of the severing cord 17 may be attached to tab 16 of first layer 11 such that when the first layer 11 is peeled from the second layer 12, the severing cord 17 remains attached to the first layer 11. In this regard, a user desiring to deactivate the RFID portion 13 of the identification tag 10 simply manipulates the tab 16 and at least partially peels the first layer 11 away from the second layer 12. This could be done manually and may also be done with a deactivation device capable of manipulating the tab 16 so as to at least partially peel the first layer 11 away from the second layer 12. The severing cord 17 is pulled upwardly with the first layer 11, thus tearing through the RFID portion 13 and mechanically severing the circuit chip 14 and/or antenna 15 as shown in FIG. 1C. Advantageously, severing cords 17 used in accordance with the depicted embodiment permanently deactivate the RFID portion 13 of the identification tag 10.

In another embodiment of the present invention, the second layer 12 is coated by an environmentally reactive dye 22. Upon peeling and removal of the first layer 11, the second layer 12 becomes exposed to the environment. The environmentally reactive dye 22 is designed to react with an environmental stimulus such as oxygen, nitrogen, carbon, moisture, temperature, light, and the like. In one embodiment, the reaction may occur approximately as the reactive dye 22 is exposed to the environmental stimulus, however in other embodiments, the reaction may occur after a delay, or in still other embodiments, the reaction may occur after exposure to a combination of environmental stimuli. In alternate embodiments, the deactivation device itself may provide the environmental condition that triggers the reaction, such as by generating heat.

In the depicted embodiment, the reaction between the dye 22 and the environmental stimulus produces a color change in the dye 22 that results in an indicating color that indicates to a user that the RFID portion 13 of the identification tag 10 has been deactivated. The indicating color may be any color, such as one that is distinguishable from the color of an exterior surface of the previously removed first layer 11 so that a user may readily identify a deactivated tag from one in which the first layer has yet to be removed. For example, in various embodiments the environmentally reactive dye 22 may produce a red, orange, or black, "deactivated" color against a pale (e.g., white, yellow, etc.) exterior first layer color. The above color scheme may of course be reversed as will be apparent to one of ordinary skill in the art in view of the above disclosure. Alternatively, the color change may be a color that is visible under alternate lighting conditions, such as under ultraviolet or infrared light.

In an alternate embodiment, the environmentally reactive dye 22 may be disposed in a pattern to form indicating indicia (not shown) such as text or figures. The indicating indicia may also include certain symbols, or any combination of colors, text, figures, and symbols. In one embodiment, the indicia may include words that clearly indicate to a viewer that the RFID portion 13 has been successfully deactivated, including but not limited to "DISABLED," "DEACTIVATED," and "SAFE." Upon peeling the first layer 11 from the second layer 12, the environmentally reactive dye 22 reacts to the environmental stimulus as referenced above thereby revealing the indicia to a user. In alternate embodiments, the text may be printed in reverse, so as to be readable using a mirror or through a bottle.

In another alternative embodiment, the second layer may include preprinted indicating colors and/or indicia such that when the first layer is removed, the preprinted colors and/or indicia are revealed.

FIGS. 2-2B depict an identification tag 110 capable of visual deactivation in accordance with another embodiment of the present invention. The depicted identification tag 110 includes an RFID portion 113 having a circuit chip 114 and an antenna 115. In one embodiment, the RFID portion 113 may include a fuse 119 disposed between the circuit chip 114 and the antenna 115. In other embodiments, the fuse 119 may be disposed anywhere along the antenna 115 as will be apparent in view of the disclosure provided below. The depicted identification tag 110 includes an exothermic dye 125 that coats an area proximate the fuse 119. In one embodiment, the exothermic dye 125 may completely cover the fuse 119 as shown.

In various embodiments, the fuse 119 is structured to produce heat or light when the identification tag 110 is selected for deactivation by a user. In one embodiment, the fuse 119 may be a weakened or narrowed portion of the RFID antenna 115 that shorts out when the identification tag 110 is placed in an electromagnetic field over a certain magnitude. As the fuse 119 is shorted or otherwise activated, the fuse 119 produces heat or light as referenced above and thereby triggers an exothermal chemical reaction that changes the color of the exothermic dye 125 as shown in FIG. 2 and FIG. 2B collectively. The color change may produce any color that will indicate to a user that the RFID portion 113 of the identification tag 110 has been deactivated.

Other embodiments of the present invention are shown in FIGS. 3-6. Common to each of these embodiments are identification tags 210, 410, 510, 310 each having an RFID portion 213, 413, 513, 313. The RFID portions 213, 413, 513, 313 include circuit chips 214, 414, 514, 314 and antennas 215, 415, 515, 315. FIG. 3 depicts an identification tag 210 having a dye portion 226 in accordance with one embodiment of the invention. In the depicted embodiment, the dye portion 226 is comprised of an exothermic dye 225 and is structured to cover only a portion of the substrate 209 of the identification tag 210. In one embodiment, the dye portion 226 may possess a color substantially similar to the substrate of the identification tag 210 before deactivation of the RFID portion 213. After deactivation of the RFID portion 213, the exothermic reaction described above causes the exothermic dye 225 to change color, thereby visibly distinguishing the dye portion 226 from the remainder of the identification tag substrate 209. Such embodiments may be useful for products that have colors that may be confusingly similar to the color chosen to indicate deactivation, thus providing a contrasting border that surrounds a deactivated RFID portion 213. In alternate embodiments of the present invention, it may be advantageous to choose a color change that will allow another automatic identification method to be used after visual indication of RFID deactivation has taken place. One such embodiment is depicted in FIG. 4. In the depicted embodiment, the identification tag 410 also includes a barcode 421. Upon deactivation of the RFID portion 413 as described above, an exothermic dye 425 causes the identification tag 410 to change color, thereby visibly indicating that the RFID portion 413 is deactivated. The color change resulting from the exothermic reaction is such that the barcode 421 can still be read by a barcode scanner (not shown) after the exothermic reaction has taken place. An example of such a color may be yellow, however the color change may be any color change that will allow a barcode scanner to read the barcode 421 after the exothermal reaction has taken place. As noted above, in other embodiments the color change may be visible under alternate lighting conditions, such as under ultraviolet or infrared light. Also, the color change may only be located in certain parts of the identification tag. Embodiments such as this may be useful in applications that may require later identification of an item using other automatic identification technologies, such as barcode scanning after the RFID circuit has been disabled.

This embodiment is of particular importance in instances where redundancy is needed. If the RFID tag becomes faulty for some reason, a user could deactivate the tag which will reveal the bar code for subsequent identification of the article to which the tag is connected.

FIG. 5 shows another embodiment of the present invention. In the depicted embodiment, upon deactivation of the RFID portion 513 by heating a fuse 519, an exothermic reaction with an exothermic dye 525 causes indicia 522, such as text or figures, to appear on the surface of the identification tag 510 in substitution of a color change as described above. In another embodiment, the indicia 522 may be appear in conjunction with a color change as described above. In one embodiment, the indicia may include words that clearly indicate to a viewer that the RFID portion 513 has been successfully deactivated, as described above.

FIGS. 6-7 show another embodiment of the present invention. In the depicted embodiment, RFID portion 313 is supported by substrate 309, which is similar to that described above. Substrate 309 supports a circuit chip 314 that is connected to antenna 315. In the depicted embodiment, antenna 315 is located in a layer above circuit chip 314. A deactivation indication layer 351 serves as a deactivation indication portion and is located between circuit chip 314 and 315, as shown in FIG. 7. A removable coating 320 is also shown in FIGS. 6-7. The removable coating 320 may be any coating that is capable of being mechanically removed by a user or deactivation device. In the depicted embodiment, for example, the removable coating 320 may be removed with the edge of a coin. Such removable coatings are known in the art and typically comprise foil or ultraviolet curable coatings. In the depicted embodiment, the removable coating 320 surrounds antenna 315, although in other embodiments, the removable coating 320 may be in close proximity to the antenna 315, such as covering antenna 315 or located below antenna 315. When a user removes the removable coating 320, antenna 315 becomes detached from circuit chip 314, thereby deactivating the RFID portion 313. Upon removing the removable coating 320, an indicating indicia 322 and/or an indicating color (not shown), which has been pre-preprinted onto deactivation indicating layer 351, is revealed. As noted above, the indicating indicia may include color, text, figures, symbols, or combinations of the above. In the depicted embodiment, the indicating indicia 322 is a universal "no" symbol characterized by a red circle and slash, overlapping a symbol referencing radio waves.

Another embodiment of the present invention is depicted in FIGS. 8-11. In the depicted embodiment, an identification tag 610 is shown having multiple layers that together visually indicate deactivation when the identification tag 610 has been deactivated. In the depicted embodiment, the identification tag 610 generally includes an RFID portion 613 and a deactivation indicating portion 650. As shown in FIG. 10, the deactivation indicating portion includes a dual indicating layer 671 and a deactivation device. In the depicted embodiment, the deactivation device is a tape assembly 655. As will be discussed in detail below, the RFID portion 613 is deactivated when the tape assembly 655 is removed from the identification tag 610.

In general, the RFID portion 613 is located between a first layer 611 and a second layer 612. In the depicted embodiment, the first layer 611 comprises an outer layer 616, and the second layer 612 comprises the dual indicating layer 671 and a dielectric substrate layer 609. The outer layer 616 is constructed of a destructible vinyl or polypropylene material that is designed to fracture upon tearing, however it may be constructed of any material capable of severing when the tape assembly 655 is removed from the identification tag 610. A dielectric substrate layer 609 is included to support the RFID portion 613. It should also be noted that in other embodiments, the outer layer 616 and the dielectric substrate layer 609 may be omitted without deviating from the spirit of the present invention. In the depicted embodiment, the RFID portion 613 and the tape assembly 655 are located between the outer layer 616 and the dual indicating layer 671, and the RFID portion 613 is adhered to the dual indicating layer 671. It should be noted that in order to simplify the figures, FIG. 10 (as well as other like figures throughout) shows the first layer 611 separated from the RFID portion 613, however in practice, the outer layer 616 contacts and is adhered to the RFID portion 613.

As shown in FIG. 8, the tape assembly 655 includes a pull-tab 656 and a tape portion 657. The tape portion 657 is made of a polypropylene material as is common in commercially available "tear tapes." However, the tape portion may be made of any material suitable for severing the layers of the identification tag 610, including polyester, cellophane, laminates, and other materials including those described with respect to the severing cord above. The pull-tab 656 may be integral with the tape portion 657 or it may be a separate component that is attached to the pull-tab 656 such that when the tape assembly 655 is removed from the identification tag 610, the tape portion 657 remains attached to the pull-tab 656. As such, the pull-tab 656 may be made of a polypropylene film or other like material, including those described with respect to the tape portion 657, that allows for removing the tape assembly 655 from the identification tag 610. In the depicted embodiment, at least a part of the tape assembly 655 is attached to the RFID portion 613. The tape portion 657 may be attached in close proximity to the circuit chip 614 with an adhesive 658. In the depicted embodiment, the tape portion 657 is attached above the circuit chip 314. It should be noted that although the identification tag 610 is depicted as having a particular geometry, the identification tag 610 may have any shape that is suitable for supporting the RFID portion 613, including but not limited to a triangular shape and a circular shape. Additionally, although the pull-tab 656 is depicted as having a particular geometry, it may also have any shape that is suitable for a user or deactivation device to grab in order to remove the tape assembly 655 from the identification tag 610.

As noted above, in the depicted embodiment, the deactivation indicating portion 650 also includes a dual indicating layer 671. The dual indicating layer 671 comprises a two-component color generating system as is commonly known in the commercial paper industry with regard to pressure sensitive copying paper and carbonless papers, as generally described in U.S. Pat. Nos. 2,730,456 and 2,730,457 to Green et al., the entire contents of which are hereby incorporated by reference. These patents describe two-component color generating systems in which an encapsulated ink reacts with a reactant coating to produce coloration. The capsules may be specifically designed to react with an associated reactant coating. When the capsules are ruptured, the ink reacts with the reactant coating to produce coloration. Along these lines, the dual indicating layer 671 of the embodiment of the present invention depicted in FIGS. 8-11 generally comprises a two-component color generating system. Referring to FIG. 11, a layer of capsules 661, containing indicating ink 665, is applied to a top surface of the dual indicating layer 671. Likewise, a reactant coating 662 is also applied to the top surface of the dual indicating layer 671. In several embodiments, the reactant coating 662 may coat areas of the top surface of the dual indicating layer 671 that contain capsules 661, or the reactant coating 662 may coat areas surrounding various areas containing the capsules 661. In an another embodiment depicted in FIG. 12, the dual indicating layer 671 may be substituted with a two-layer system comprising a top indicating layer 751 and a bottom indicating layer 752. In this embodiment, the top indicating layer 751 includes capsules 761 containing indicating ink 765 on a bottom side of the top indicating layer 751, and the bottom indicating layer 752 includes a reactant coating 762 on a top side of the bottom indicating layer 752.

Referring to the embodiment depicted in FIGS. 8-11, and as indicated above, the RFID portion 613 is located between the outer layer 616 and the dual indicating layer 671. The tape portion 657 of the tape assembly 655 is attached to the top of the circuit chip 614 of the RFID portion 613 with an adhesive 658. In various embodiments, the second layer 612 of the identification tag 610 may include an adhesive (not shown) on a bottom surface for securing the identification tag 610 to a retail product or other item. In various embodiments, a user desiring to deactivate the identification tag 610 manipulates the pull-tab 656 and pulls the tape assembly 655 across the identification tag 610. The pull-tab 656 may be manipulated manually or through the use of a tool or other similar mechanism capable of manipulating the pull-tab 656. As such, the pull-tab 656 may include various indicia 659 instructing a user regarding how to pull the tape assembly 655 in order to deactivate the identification tag 610. Likewise, the top surface of the outer layer 616 may also include indicia (not shown) instructing a user regarding deactivation of the identification tag 610.

In the depicted embodiment, upon pulling the tape assembly 655 across the identification tag 610, the circuit chip 614 remains attached to the tape portion 657 such that the circuit chip 614 is detached from the antenna 615, thereby permanently deactivating the RFID portion 613 of the identification tag 610, as shown in FIG. 13. As the tape assembly 655 is removed from the identification tag 610, the circuit chip 614 ruptures the capsules 661 containing the indicating ink 665 underneath the circuit chip 614. As the capsules 661 containing the indicating ink 665 are ruptured, the released indicating ink 665 is then exposed to the reactant coating 662 included on the dual indicating layer 671 in the area in which the capsules 661 were ruptured. The reaction between the indicating ink 665 and the reactant then produces a visual indicating color 673, as shown in FIG. 14. The color may be any color, and may be a color that is distinguishable from the color of an exterior surface of the identification tag such that a user may readily identify a deactivated tag from one in which the pull tag assembly 655 has not been removed from the identification tag 610. For example, in various embodiments the indicating color 673 may be a red, orange, or black, "deactivated" color against a pale (e.g., white, yellow, etc.) exterior first layer color. The above color scheme may of course be reversed as will be apparent to one of ordinary skill in the art in view of the above disclosure.

Alternatively, the reaction between the indicating ink 665 and the reactant coating 662 may produce an indicating indicia 674. The indicating indicia 674 may include text or figures that clearly indicate to a viewer that the RFID portion 613 of the identification tag 610 has been successfully deactivated, including but not limited to "DISABLED," "DEACTIVATED," and "SAFE," as shown by example in FIG. 15.

Another embodiment of the present invention is depicted in FIGS. 16-18. In the depicted embodiment, an identification tag 810 is shown having multiple layers that together visually indicate deactivation when at least a part of an RFID portion 813 of the identification tag 810 has been deactivated. The depicted embodiment is generally similar to the embodiment depicted in FIGS. 8-11, however, in this embodiment, the tape portion 857 is attached below the circuit chip 814 with an adhesive 858. Additionally, the tape portion 857 is also adhered to a dual indicating layer 871, which contains a similar two-part color generating system as the embodiment depicted in FIGS. 8-11. It should be noted that in other embodiments of this invention, the dual indicating layer 871 may be substituted with a two-layer system as described above.

In various embodiments, a user desiring to deactivate the identification tag 810 manipulates the pull-tab 856 as described above and pulls the tape assembly 855 across the identification tag 810 in a similar manner as the embodiment depicted in FIGS. 8-11. Upon pulling the tape assembly 855 across the identification tag 810, the circuit chip 814 remains attached to the tape portion 857 such that the circuit chip 814 is detached from the antenna 815, thereby permanently deactivating the RFID portion 813 of the identification tag 810, in a similar manner as that shown in FIG. 13. In the depicted embodiment, as the tape assembly 855 is removed from the identification tag 810, the tape portion 857 ruptures the capsules 861 containing the indicating ink 865 underneath the tape portion 857 of the tape assembly 855. As the capsules 861 containing the indicating ink 865 are ruptured, the released indicating ink 865 is then exposed to the reactant coating 862 included on the dual indicating layer 871 in the area in which the capsules 861 were ruptured. The reaction between the indicating ink 865 and the reactant coating 862 then produces a visual indicating color 873, as shown in FIG. 19. As noted above, the color may be any color, and may be a color that is distinguishable from the color of an exterior surface of the identification tag such that a user may readily identify a deactivated tag from one in which the tape assembly 855 has not been removed from the identification tag 810. Alternatively, the reaction between the indicating ink 865 and the reactant coating 862 may produce an indicating indicia 874. The indicating indicia 874 may include text or figures that clearly indicate to a viewer that the RFID portion 813 of the identification tag 810 has been successfully deactivated, as described above, and as shown by example in FIG. 20.

Another embodiment of the present invention is depicted in FIG. 21. In the depicted embodiment, an identification tag 910 is shown having multiple layers that together visually indicate deactivation when at least a part of an RFID portion 913 of the identification tag 910 has been deactivated. The depicted embodiment is generally similar to the embodiments depicted above, however, the tape portion 957 is attached adjacent to a portion of the antenna 915, with the tape portion 957 also being adhered to a dual indicating layer 971 (or, in other embodiments, a two-layer two-component color generating system as described above). In various embodiments, a user desiring to deactivate the identification tag 910 simply manipulates the pull-tab 956 and pulls the tape assembly 955 across the identification tag 910, in a similar manner as described above. Upon pulling the tape assembly 955 across the identification tag 910, a portion of the antenna 915 located adjacent to the tape portion 951 is severed from the remaining portion of the antenna 915, thereby changing the frequency response of the RFID portion 913 of the identification tag 910. In the depicted embodiment, as the tape assembly 955 is removed from the identification tag 910, the tape portion 952 ruptures the capsules 961 containing the indicating ink 965 underneath the tape portion 952 of the tape assembly 955. As the capsules 961 containing the indicating ink 965 are ruptured, the released indicating ink 965 is then exposed to the reactant coating 962 in a similar manner as described above. Visual indication similar to that described above may then be produced to indicate that a portion of the RFID portion 913 has been deactivated.

Another embodiment of the present invention is depicted in FIGS. 22-25. The identification tag 1010 of the depicted embodiment is similar to those embodiments described above, however the RFID portion 1013 is located between a first layer 1011, which comprises an outer layer 1016 and a top indicating layer 1051, and a second layer 1012, which comprises the bottom indicating layer 1052 and a dielectric substrate layer 1009. As described above, the outer layer 1016 and the top indicating layer 1051 may be constructed of a destructible vinyl or polypropylene material that is designed to fracture upon tearing, however each or both of the outer layer 1016 and the top indicating layer 1051 may be constructed of any material capable of severing when the tape assembly 1055 is removed from the identification tag 1010. As noted above, in other embodiments, the outer layer 1016 and dielectric substrate layer 1009 may be omitted without deviating from the spirit of the present invention.

The deactivation indicating portion 1050 of the depicted embodiment includes the top indicating layer 1051 and the bottom indicating layer 1052. Together the top indicating layer 1051 and the bottom indicating layer 1052 create a separated two part two-component color generating system. Referring to FIG. 25, a layer of capsules 1061 containing indicating ink 1065 is applied to a bottom surface of the top indicating layer 1051. Likewise, a reactant coating 1062 is applied to a top surface of the bottom indicating layer 1052.

The RFID portion 1013 is located between the top indicating layer 1051 and the bottom indicating layer 1052. In the depicted embodiment, the tape portion 1057 of the tape assembly 1055 is attached to the top of the circuit chip 1014 of the RFID portion, however as described above, the tape portion 1057 may alternatively be located below the RFID portion 1013. In the depicted embodiment, upon pulling the tape assembly 1055 across the identification tag 1010, the circuit chip 1014 remains attached to the tape portion 1057 such that the RFID portion 1013 is deactivated. As the tape assembly 1055 is removed from the identification tag 1010, the tape portion 1057 severs the top indicating layer 1051. As the top indicating layer 1051 is severed, capsules 1061 containing the indicating ink 1065 are ruptured along tear lines 1081 (shown in FIGS. 26-28). The released indicating ink 1065 is then exposed to the reactant coating 1062 included on the bottom indicating layer 1052. In one embodiment, relatively small capsules 1061 are used on the first indicating layer 1051 such that the reaction between the indicating ink and the reactant produces a visual indicating color 1073 along the tear lines 1081, as shown in FIG. 26. In another embodiment, larger capsules 1061 are used on the top indicating layer 1051 such that the indicating ink is exposed to a greater area of the reactant coating 1062 on the bottom indicating layer 1052 resulting in an indicating color 1073A covering a larger area, as shown in FIG. 27. Alternatively, the reaction between the indicating ink 1065 and the reactant coating 1062 may produce an indicating indicia 1074, as shown in FIG. 28.

In response to privacy concerns with regard to the increased use of RFID technology, the present invention provides a device for deactivating an RFID portion located on an identification tag, and also provides visual indication that an RFID portion has been deactivated. Deactivation of the RFID portion triggers a visual indication that the RFID portion is deactivated, thus resulting in an accurate representation of RFID deactivation. So designed, deactivation of an RFID portion will be apparent to a viewer without the use of additional equipment or electronics.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An identification tag for visually indicating deactivation, the identification tag comprising:
    an electronic circuit portion for storing an identification associated with the tag; and
    a deactivation indicating portion,
    wherein the deactivation indicating portion is capable of visually indicating deactivation of at least a part of the electronic circuit portion,
    wherein the electronic circuit is deactivated in response to exposure to an environmental stimulus, and
    wherein the deactivation indicating portion is caused to visually indicate deactivation following identification tag exposure to the environmental stimulus.

2. The identification tag according to claim 1, wherein the environmental stimulus is heat.

3. The identification tag according to claim 1, wherein the electronic circuit portion comprises a fuse that operates to deactivate the electronic circuit in response to exposure to the environmental stimulus.

4. The identification tag according to claim 3, wherein the environmental stimulus is an applied electromagnetic field.

5. The identification tag according to claim 4, wherein the applied electromagnetic field causes the fuse to produce heat that causes the deactivation indicating portion to visually indicate deactivation.

6. The identification tag according to claim 5, wherein the deactivation indicating portion comprises an exothermic dye, wherein the exothermic dye changes from a first color to a second color in response to the fuse producing heat.

7. The identification tag according to claim 1, wherein the deactivation indicating portion includes an exothermic dye, wherein the exothermic dye changes from a first color to a second color in response to the environmental stimulus.

8. The identification tag according to claim 7, wherein the exothermic dye is configured as text or as a figure.

9. The identification tag according to claim 1 further comprising a barcode, wherein the barcode remains readable after the deactivation indicating portion is caused to visually indicate deactivation.

10. A method for visually indicating deactivation of a identification tag, the method comprising:
    providing an identification tag comprising an electronic circuit portion, and a deactivation indicating portion;
    exposing the identification tag to an environmental stimulus,
    wherein the electronic circuit is deactivated in response to exposing the identification tag to the environmental stimulus, and
    wherein the deactivation indicating portion is caused to visually indicate deactivation following exposing the identification tag to the environmental stimulus.

11. The method of claim 10, wherein the environmental stimulus is heat.

12. The method of claim 10, wherein the electronic circuit portion comprises a fuse that operates to deactivate the electronic circuit in response to exposure to the environmental stimulus.

13. The method of claim 12, wherein the environmental stimulus is an applied electromagnetic field.

14. The method of claim 13, wherein the applied electromagnetic field causes the fuse to produce heat that causes the deactivation indicating portion to visually indicate deactivation.

15. The method of claim 14, wherein the deactivation indicating portion comprises an exothermic dye, wherein the exothermic dye changes from a first color to a second color in response to the fuse producing heat.

16. The method of claim 10, wherein the deactivation indicating portion includes an exothermic dye, wherein the exothermic dye changes from a first color to a second color in response to the environmental stimulus.

17. The method of claim 16, wherein the exothermic dye is configured in the pattern of text or a figure.

18. The method of claim 10 further comprising a barcode, wherein the barcode remains readable after the deactivation indicating portion is caused to visually indicate deactivation.

19. A system for indicating deactivation of a identification tag, the system comprising:
    an identification tag comprising an electronic circuit portion, and a deactivation indicating portion;
    an apparatus for exposing the identification tag to an environmental stimulus, wherein the electronic circuit is deactivated in response to exposing the identification tag to the environmental stimulus, and wherein the deactivation indicating portion is caused to visually indicate deactivation following exposing the identification tag to the environmental stimulus.

20. The system of claim 19, wherein the environmental stimulus is heat, and wherein the apparatus is configured to generate heat.

21. The system of claim 19, wherein the environmental stimulus is an applied electromagnetic field, and wherein the apparatus is configured to generate the applied electromagnetic field.

* * * * *